United States Patent
Ishikawa et al.

(10) Patent No.: US 9,348,201 B2
(45) Date of Patent: May 24, 2016

(54) IMAGE PROJECTION APPARATUS

(71) Applicants: Naoyuki Ishikawa, Kanagawa (JP);
Masamichi Yamada, Kanagawa (JP);
Tetsuya Fujioka, Kanagawa (JP);
Yasutada Tsukioka, Kanagawa (JP);
Hideo Kanai, Tokyo (JP)

(72) Inventors: Naoyuki Ishikawa, Kanagawa (JP);
Masamichi Yamada, Kanagawa (JP);
Tetsuya Fujioka, Kanagawa (JP);
Yasutada Tsukioka, Kanagawa (JP);
Hideo Kanai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/728,796

(22) Filed: Jun. 2, 2015

(65) Prior Publication Data

US 2015/0268541 A1 Sep. 24, 2015

Related U.S. Application Data

(63) Continuation of application No. 13/664,728, filed on Oct. 31, 2012, now Pat. No. 9,086,615.

(30) Foreign Application Priority Data

Nov. 4, 2011 (JP) ................................. 2011-242925

(51) Int. Cl.
*G03B 21/20* (2006.01)
*G03B 21/16* (2006.01)
(Continued)

(52) U.S. Cl.
CPC .......... *G03B 21/145* (2013.01); *G03B 21/2046* (2013.01); *G03B 21/2093* (2013.01); *H04N 9/3141* (2013.01); *G03B 21/20* (2013.01)

(58) Field of Classification Search
CPC ...... G03B 21/16; G03B 21/20; G03B 21/202; G03B 21/14
USPC .......... 353/119, 122, 57, 58, 60, 61; 362/362, 362/374, 375
See application file for complete search history.

(56) References Cited

U.S. PATENT DOCUMENTS 4,586,117 A 4/1986 Collins
6,902,275 B2 6/2005 Yamada et al.
(Continued)

FOREIGN PATENT DOCUMENTS

CN 1825202 A 8/2006
CN 1885933 A 12/2006
(Continued)

OTHER PUBLICATIONS

Combined Chinese Office Action and Search Report issued Oct. 27, 2014 in Patent Application No. 201210595732.0 (with English language translation).
(Continued)

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

An image projection apparatus includes a light source unit including a light source detachable from a main body, an image forming part to form an image with a light from the light source, a projection optical system to project the image, an openable cover to open and close an opening formed for attaching and detaching the light source unit to and from the main body, an abutting member on which the light source unit abuts when the light source unit is attached to the main body, and a pressing member to press the light source unit to the abutting member, in conjunction with a fix operation of the openable cover to the main body.

16 Claims, 24 Drawing Sheets

(51) Int. Cl.
*F21V 21/00* (2006.01)
*G03B 21/14* (2006.01)
*H04N 9/31* (2006.01)

(56) References Cited

U.S. PATENT DOCUMENTS

| | | |
|---|---|---|
| 7,241,029 B2 | 7/2007 | Tsai |
| 7,357,537 B2 | 4/2008 | Masuoka et al. |
| 7,841,728 B2 | 11/2010 | Morikuni et al. |
| 8,613,518 B2 | 12/2013 | Matsumiya et al. |
| 8,882,277 B2 | 11/2014 | Fujioka et al. |
| 8,985,786 B2 | 3/2015 | Fujioka et al. |
| 9,010,939 B2 | 4/2015 | Fujioka et al. |
| 9,052,580 B2 | 6/2015 | Fujioka et al. |
| 2004/0156117 A1 | 8/2004 | Takaura et al. |
| 2004/0239897 A1 | 12/2004 | Ogawa et al. |
| 2007/0019211 A1 | 1/2007 | Murasugi |
| 2007/0206163 A1 | 9/2007 | Kuroda |
| 2008/0094582 A1 | 4/2008 | Nakagawa et al. |
| 2010/0201957 A1 | 8/2010 | Koyama et al. |
| 2011/0075110 A1* | 3/2011 | Liang et al. .................... 353/58 |
| 2014/0078477 A1 | 3/2014 | Matsumiya et al. |

FOREIGN PATENT DOCUMENTS

| | | |
|---|---|---|
| CN | 101165589 A | 4/2008 |
| CN | 101526724 A | 9/2009 |
| JP | 3092161 U | 2/2003 |
| JP | 2008-76861 | 4/2008 |
| JP | 2010-085555 | 4/2010 |
| JP | 2010-210985 A | 9/2010 |
| JP | 2012-173597 A | 9/2012 |
| WO | WO 2011/064874 A1 | 6/2011 |

OTHER PUBLICATIONS

Extended European Search Report issued on Feb. 19, 2013, in European Patent Application No. 12190875.0.
Office Action issued Aug. 28, 2015 in Japanese Patent Application No. 2011-242925.

* cited by examiner

IMAGE PROJECTION APPARATUS

CROSS-REFERENCE TO RELATED APPLICATIONS

The present application is a continuation of U.S. application Ser. No. 13/664,728, filed Oct. 31, 2012, which claims priority to and incorporates by reference the entire contents of Japanese Patent Application No. 2011-242925 filed in Japan on Nov. 4, 2011. The entire contents of each of the above are incorporated herein by reference.

BACKGROUND OF THE INVENTION

1. Field of the Invention

The present invention relates to an image projection apparatus.

2. Description of the Related Art

Conventionally, there is known an image projection apparatus provided with an image forming unit to form an image with light emitted from a light source such as a halogen lamp, a metal halide lamp and a high pressure mercury lamp on the basis of image data from a personal computer (PC), video camera or the like, so that the image is projected and displayed on a screen or the like.

A light source unit provided with the light source is fixed inside of the image projection apparatus by screws. Therefore, in order to replace the light source unit, a tool such as a driver is required to loosen and tighten the screws.

Japanese Patent Application Laid-open No. 2010-85555 discloses an image projection apparatus capable of fixing a light source unit to the apparatus without using screws. Specifically, the light source unit is provided with a lever. By operating this lever, the light source unit is fixed to the apparatus.

In the image projection apparatus disclosed in Japanese Patent Application Laid-open No. 2010-85555, however, in order to replace the light source unit, an access cover of a main body for mounting and removing the light source unit is removed to expose the light source unit. Then, the lever of the light source unit is manipulated to release the fixed light source unit and remove the released light source unit. After a new light source unit is placed in a position, the lever is manipulated to fix the new light source unit. After that, the access cover is fixed to the main body. Thus, the replacement operation is still complicated.

SUMMARY OF THE INVENTION

It is an object of the present invention to at least partially solve the problems in the conventional technology.

An image projection apparatus includes a light source unit including a light source and configured to be attachable to and detachable from a main body of the apparatus, an image forming part configured to form an image by using a light from the light source, a projection optical system configured to project the image, an openable and closable cover configured to open and close an opening, the opening formed for attaching and detaching the light source unit to and from the main body, an abutting member on which the light source unit abuts when the light source unit is attached to the main body, and a pressing member configured to press the light source unit to the abutting member, in conjunction with a fix operation of the openable and closable cover to the main body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
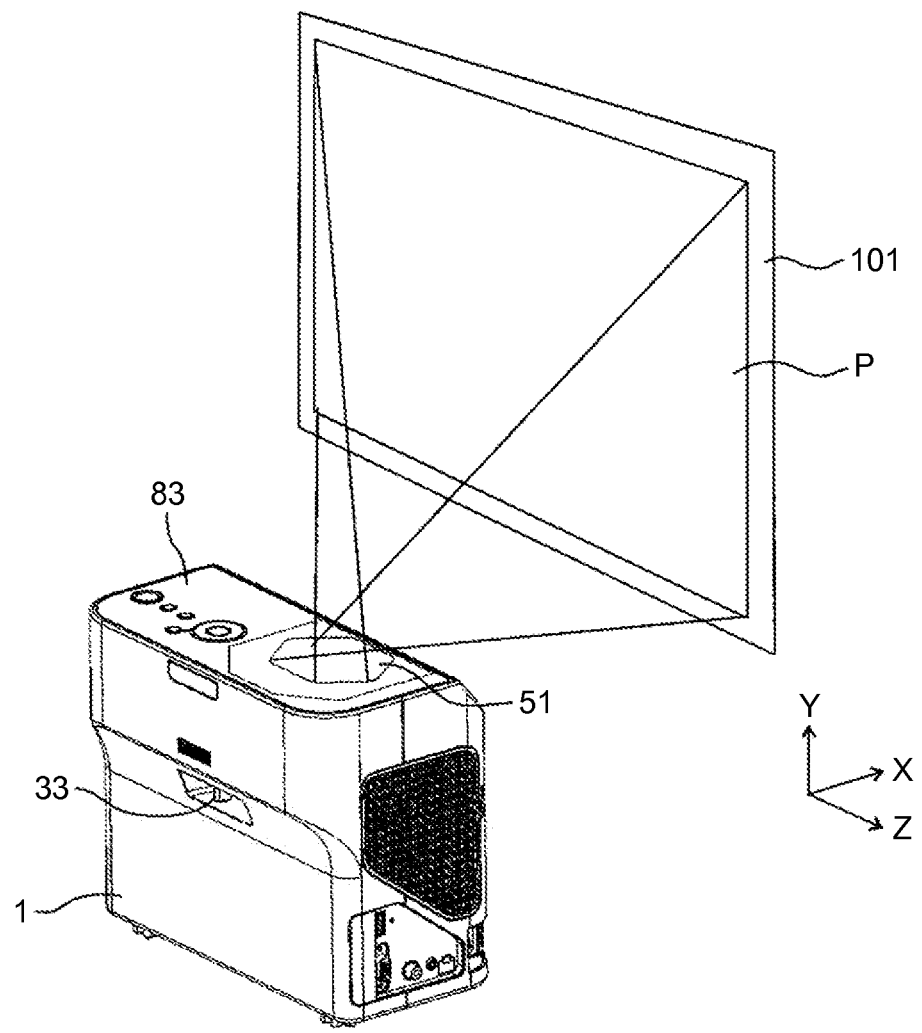
FIG. 1 is a perspective view illustrating a projector and a projection plane according to an embodiment.

Hereinafter, embodiments of a projector as an image projecting apparatus according to the present invention will be described with reference to the accompanying drawings. FIG. 1 perspectively illustrates a projector 1 and a projection plane 101 such as a screen according to an embodiment. Incidentally, in the following explanation, a normal line direction of the projection plane 101 is referred to as X direction, a short axis direction (vertical direction) of the projection plane 101 is referred to as Y direction, and a long axis direction (horizontal direction) of the projection plane 101 is referred to as Z direction.

As illustrated in FIG. 1, a transmissive glass 51 from which a projection image P is emitted is disposed at a top surface of the projector 1. The projection image P emitted from the transmissive glass 51 is projected on the projection plane 101 such as a screen.

Furthermore, at the top surface of the projector 1, an operating part 83 by which a user operates the projector 1 is disposed. At a side surface of the projector, a focus lever 33 for a focus adjustment is disposed.

Figure 2:
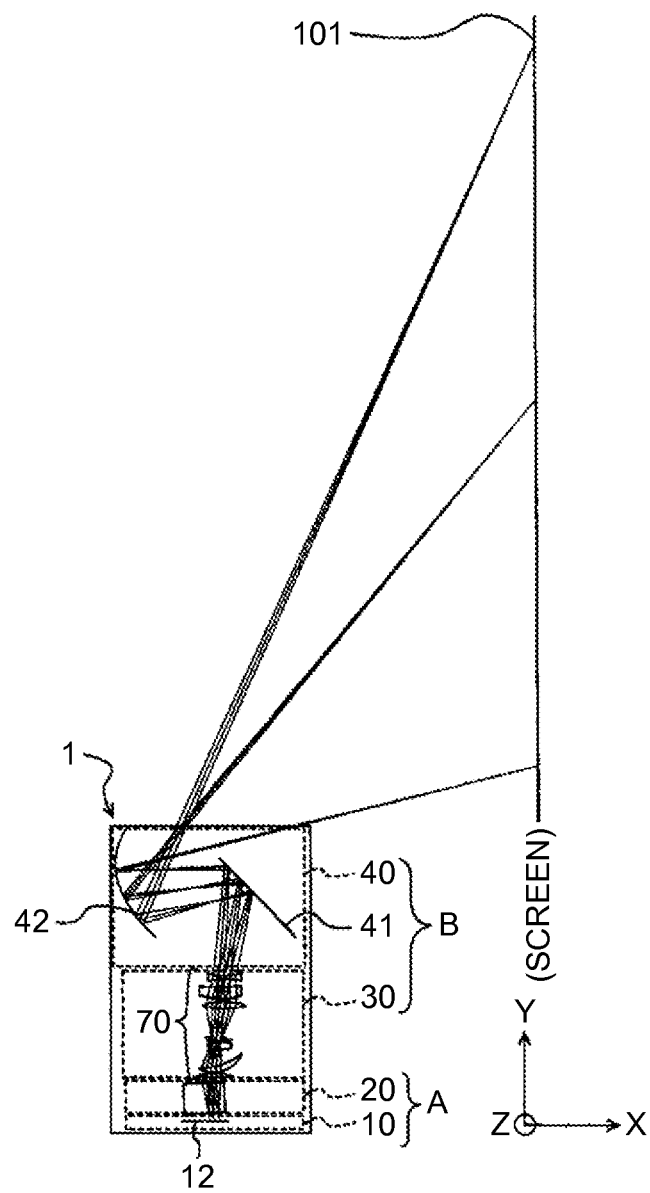
FIG. 2 is a schematic view illustrating light paths from the projector to the projection plane.

FIG. 2 illustrates light paths from the projector 1 to the projection plane 101.

The projector 1 is provided with (i) a light source unit including a light source and (ii) an image forming part A to form an image by using a light from the light source. The image forming part A includes (i) an image forming unit 10 provided with a DMD (Digital Mirror Device) 12 as an image forming element and (ii) a lighting unit 20 for reflecting the light from the light source to the DMD 12 so that an optical image is generated. The projector 1 is also provided with a projection optical system B to project the image on the projection plane 101. The projection optical system B has at least one transmissive refracting optical system and includes (i) a first optical unit 30 provided with a first optical system 70 which is a coaxial optical system having a positive power and (ii) a second optical unit 40 provided with a reflecting mirror 41 and a curved mirror 42 having a positive power.

The DMD 12 is irradiated with the light from the light source by the lighting unit 20. The light irradiated by the lighting unit 20 is modulated to form the image. The optical image formed by the DMD 12 is projected on the projection plane through the first optical system 70 in the first optical unit 30, and the reflecting mirror 41 and the curved mirror 42 in the second optical unit 40.

Figure 3:
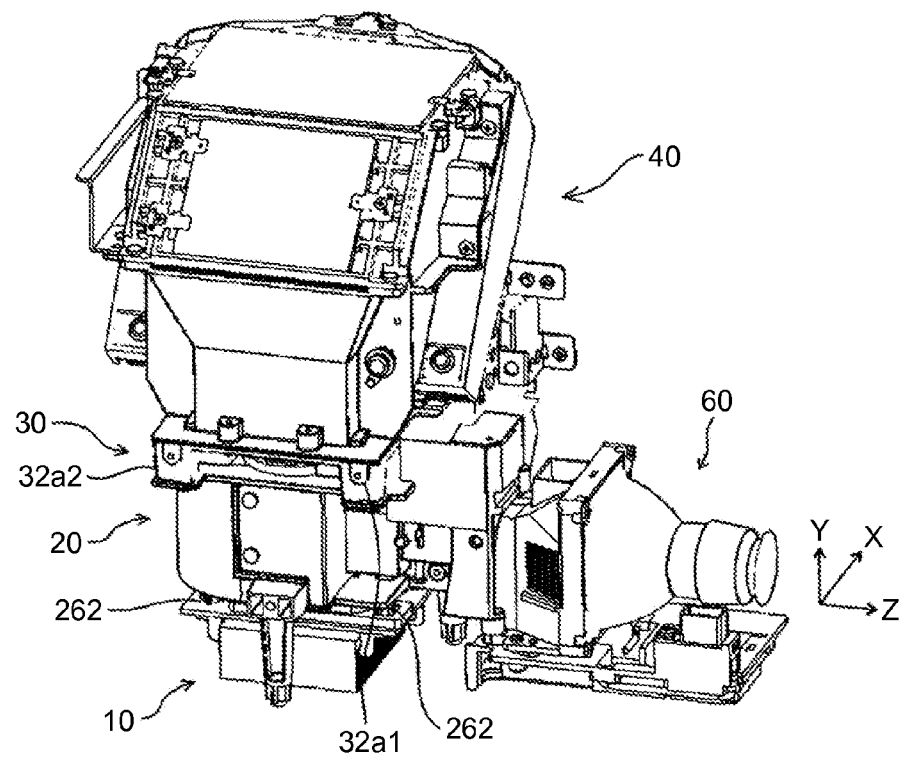
FIG. 3 is a perspective view illustrating an internal structure of the projector.

FIG. 3 schematically and perspectively illustrates an internal structure of the projector 1.

As illustrated in FIG. 3, the image forming unit 10, the lighting unit 20, the first optical unit 30, the second optical unit 40 are aligned in Y direction in the figure among directions parallel to the projection plane and an image plane of the projection image. The light source unit 60 is disposed at a right side in the figure of the lighting unit 20.

Incidentally, in FIG. 3, reference numerals 32$a$1 and 32$a$2 refer to legs of a lens holder 32 of the first optical unit 30, and reference numeral 262 refers to a screw clamp portion for screwing (fixing by screw) the image forming unit 10 to the lighting unit 20.

Next, each unit structure will be described.

First, the light source unit 60 will be described.

Figure 4:
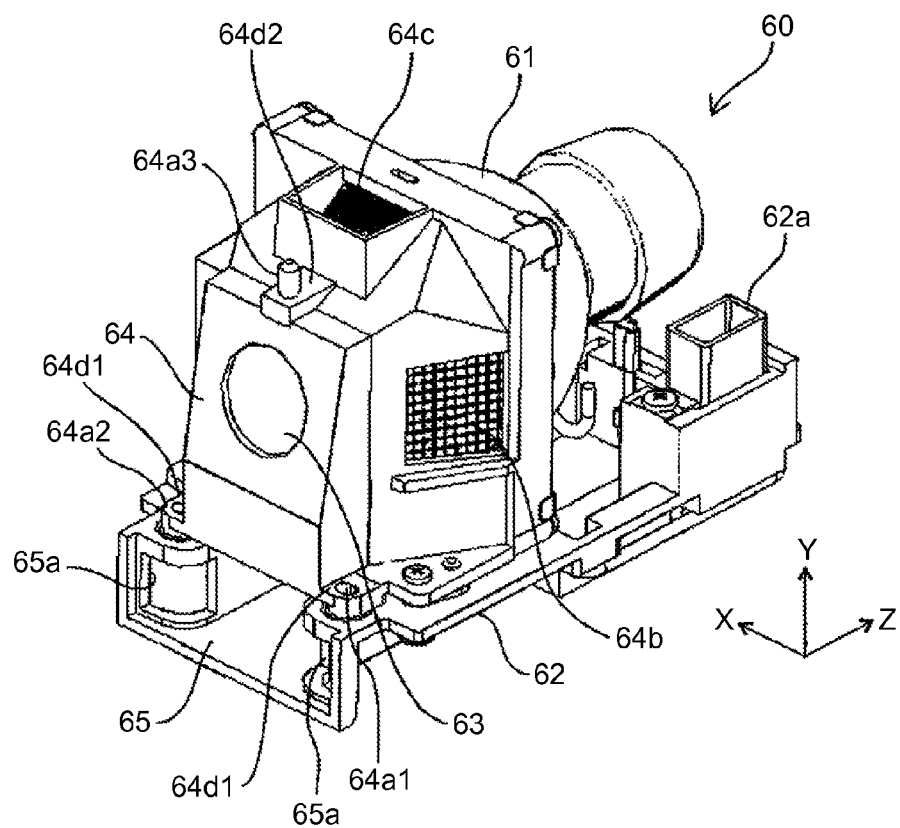
FIG. 4 is a perspective view illustrating a light source unit.

FIG. 4 schematically and perspectively illustrates the light source unit 60.

The light source unit 60 includes a light source bracket 62. A light source 61 such as a halogen lamp, a metal halide lamp and a high pressure mercury lamp is mounted on the light source bracket 62. The light source bracket 62 is provided with a connector portion 62$a$ for connecting with a power source side connector connected to a power source unit 80 (see FIG. 14).

A holder 64, which holds a reflector and the like, is screwed to the light source 61 on the light source bracket 62 at a light emitting side of the light source 61. The holder 64 has an emitting window 63 at an opposite side to the light source 61 side. The light emitted from the light source 61 is collected to the emitting window 63 by the reflector, which is held by the holder 64, and emitted from the emitting window 63.

Light source positioning portions 64$a$1 to 64$a$3 are disposed at a top side and at both ends of a bottom side of the holder 64, for positioning the light source unit 60 relative to a lighting bracket 26 (see FIG. 6) of the lighting unit 20. The light source positioning portion 64$a$3 disposed at the top side of the holder 64 is a protrusion or has a protrusion-like structure. The light source positioning portions 64$a$1 and 64$a$2 disposed at both ends of the bottom side of the holder 64 are holes or have hole-like structures.

At a side surface of the holder 64, a light source air inlet 64$b$ is disposed for allowing an incoming flow of the air to cool down the light source 61. At a top surface of the holder 64, a light source air outlet 64$c$ is disposed for allowing an outgoing flow of the air heated by the light source 61.

An airflow path 65 is disposed at the light source bracket 62, for allowing an incoming flow of the air taken from an air intake blower (see FIG. 21 and the like) as described later. At the air intake side (front side in the figure) of the airflow path 65, openings 65$a$ are disposed for guiding a part of the airflow to the airflow path 65 to between the light source unit 60 and an access cover 54 (see FIG. 7) which will be described later. The cooling of the light source unit 60 will be described later.

A planar portion 64$d$2 on which the light source positioning protrusion 64$a$3 is formed as illustrated in FIG. 4, and planar portions 64$d$1 provided with the light source positioning holes 64$a$1 and 64$a$2 are abutting members for abutting against the lighting bracket when pressed by a pressing member of the access cover, as described later.

Next, the lighting unit 20 will be described.

Figure 5:
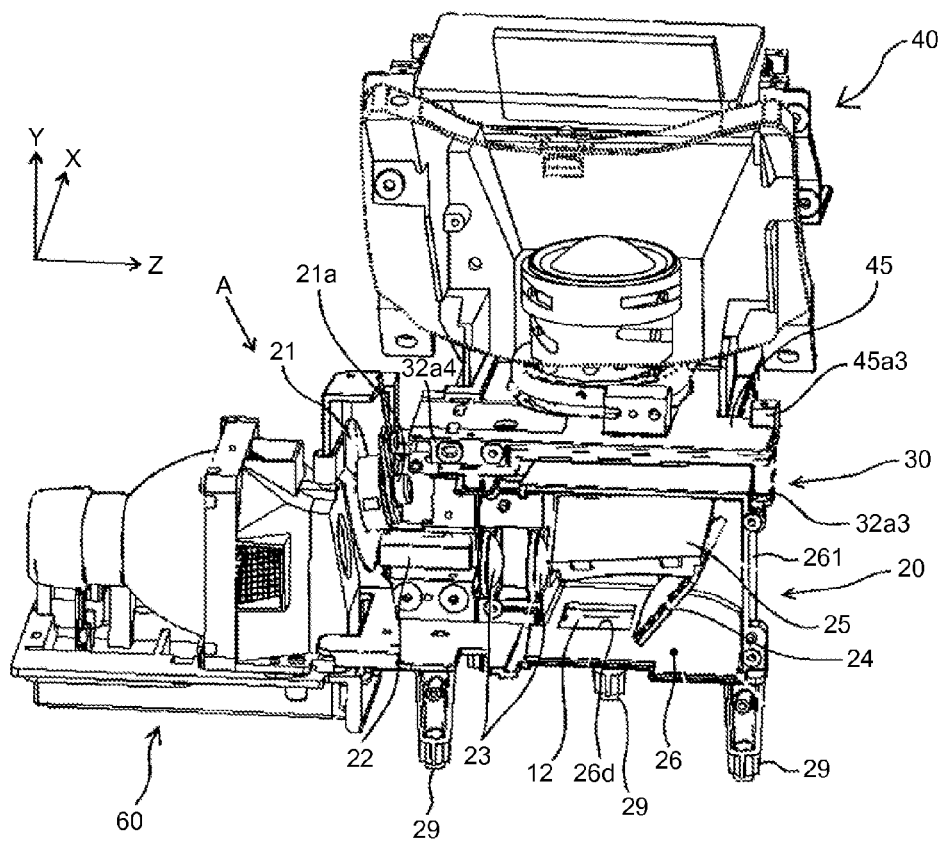
FIG. 5 is a perspective view illustrating optical components in a lighting unit, with other units.

FIG. 5 perspectively illustrates optical components housed in the lighting unit 20, while also illustrating other units.

As illustrated in FIG. 5, the lighting unit 20 includes a color wheel 21, a light tunnel 22, two relay lenses 23, a cylinder mirror 24, and a concave mirror 25, which are held by the lighting bracket 26. The lighting bracket 26 has a housing-like portion 261 in which two relay lenses 23, the cylinder mirror 24, and the concave mirror 25 are housed. Among four lateral sides of the housing-like portion 261, only right lateral side in the figure has a wall. Other three lateral sides are opened. At the opening of the lateral side deep in X direction in the figure, an OFF light board 27 (see FIG. 6) is attached. At the opening of the front lateral side in X direction in the figure, a cover component is attached. Thereby, two relay lenses 23, the cylinder mirror 24, and the concave mirror 25, which are housed in the housing-like portion 261 of the lighting bracket 26, are surrounded by the lighting bracket 26, the OFF light board 27 (see FIG. 6), and the cover component.

At a bottom side of the housing-like portion 261 of the lighting bracket 26, a lighting through hole 26d is formed for exposing the DMD 12.

The lighting bracket 26 has three legs 29. These legs 29 abut on a base component 53 (see FIG. 19) of the projector 1 to support weights of the first optical unit 30 and the second optical unit 40 which are stacked and fixed on the lighting bracket 26. These legs 29 disposed as such form a space for allowing an incoming flow of ambient air to a heat sink 13 (see FIG. 6) as a cooling unit to cool down the DMD 12 of the image forming unit 10.

Incidentally, in FIG. 5, reference numerals 32a3 and 32a4 refer to legs of the lens holder 32 of the first optical unit 30, and a reference numeral 45a3 refer to a screw fix portion 45a3 of the second optical unit 40.

Figure 6:
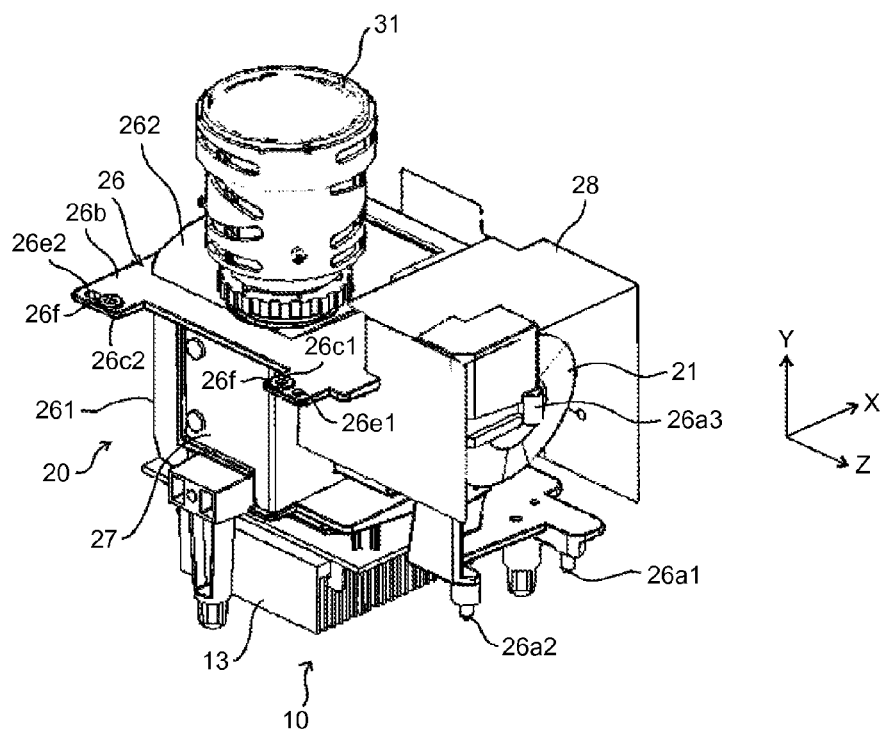
FIG. 6 is a perspective view from a direction indicated by an arrow A in FIG. 5, illustrating the lighting unit, a projection lens unit, and an image forming unit.

FIG. 6 is a perspective view from a direction indicated by an arrow A in FIG. 5 and illustrates the lighting unit 20, the projection lens unit 31, and the image forming unit 10.

At un upper side of the housing-like portion 261 of the lighting bracket 26, un upper plate 26b is disposed orthogonally to Y direction in the figure. At four corner of this upper plate 26b, through holes for letting through screws for screwing the first optical unit 30 are disposed (in FIG. 6, through holes 26c1 and 26c2 are illustrated). Through holes 26e1 and 26e2 for positioning the first optical unit 30 to the lighting unit 20 are disposed adjacent to the through holes 26c1 and 26c2 located at the front side in X direction in the figure. Among two positioning holes disposed at the front side in X direction in the figure, the positioning hole 26e1 at a side of which the color wheel 21 is disposed is a main reference for the positioning and has a round hole shape. The positioning hole 26e2 at an opposite side of the color wheel 21 installation side is a sub reference for the positioning, and has an elongate hole extending in Z direction. A periphery of through hole 26c1 and a periphery of through hole 26c2 are protruded from a surface of the upper plate 26b of the lighting bracket 26. These protruded peripheries functions as positioning protrusions 26f for positioning the first optical unit 30 in Y direction. If the positioning accuracy in Y direction should be improved without employing the positioning protrusions 26f, it is required to improve an entire flatness of the upper plate 26b of the lighting bracket 26. This raises the cost. On the other hand, by employing the positioning protrusions 26f, it is enough to improve the flatness of the positioning protrusions 26f only. Thereby, the positioning accuracy in Y direction can be improved, while saving the cost.

A light shielding plate 262 is disposed at the opening of the upper plate 26b of the lighting bracket 26. A lower portion of the projection lens unit 31 engages with the light shielding plate 262, so that the light from the upper side to inside of the housing-like portion 261 is shielded.

A space between the through hole 26c1 and the through hole 26c2 of the lighting bracket 26 is cut off so as not to be an obstacle when the second optical unit 40 is screwed to the first optical unit 30, which will be described later.

At the cooler wheel side (the front side in Z direction in the figure) of the lighting bracket 26, a cylinder-like light source positioning joint portion 26a3 is disposed. The cylinder-like light source positioning joint portion 26a3 has a vertical through hole into which the protrusion-like light source positioning portion 34a3 (see FIG. 4) formed on the upper surface of the holder 64 of the light source unit 60 fits or engages. Below the light source positioning joint portion 26a3, two protrusion-like light source positioning joint portions 26a1 and 26a2 are disposed, which engage with two hole-like light source positioning portion 64a1 and 64a2 formed on the light source bracket 62 side of the holder 64. By engaging three light source positioning portions 64a1 to 64a3 of the holder 64 with three light source positioning joint portions 26a1 to 26a3 formed on the lightning bracket 26 of the lighting unit 20, the light unit 60 is positioned and fixed to the lighting unit (see FIG. 3).

To the lighting bracket 26, a lighting cover 28 for covering the color wheel 21 and the light tunnel 22 is attached.

Figure 7:
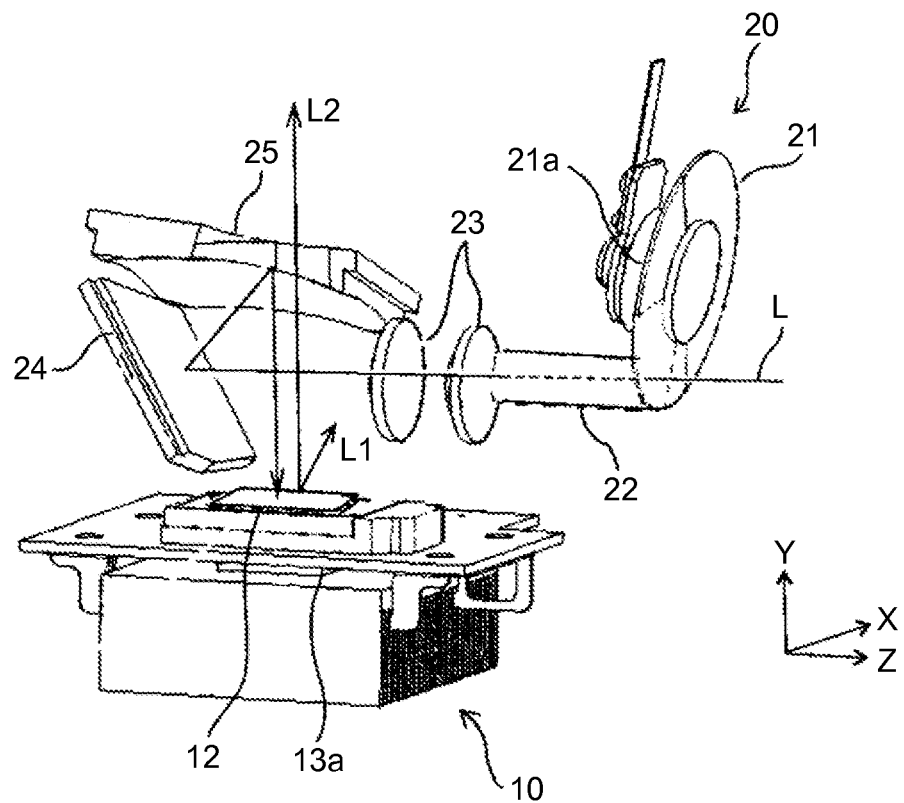
FIG. 7 is a perspective view illustrating light paths in the lighting unit.

FIG. 7 is for explaining the light path L of the light in the lighting unit 20.

The color wheel 21 has a disc-like shape, and is fixed to a motor shaft of a color motor 21a. The color wheel 21 is provided with filters such as red (R) filer, green (G) filter, and blue (B) filter in a rotating direction. The light collected by the reflector disposed on the holder 64 of the light source unit 60 reaches a peripheral portion of the color wheel 21 through the emitting window 63. The light reached the peripheral portion of the color wheel 21 is split into R, G and B in a time divided manner by the rotation of the color wheel 21.

The light split by the color wheel 21 enters the light tunnel. 22. The light tunnel 22 has a square cylinder shape. The inner peripheral surface of the light tunnel 22 is a mirror surface. The light entered the light tunnel 22 is formed into a uniform surface light source while reflected multiple times in the inner surface of the light tunnel 22, and emitted to the relay lenses 23.

The light passed through the light tunnel 22 transmits two relay lenses 23, and is reflected by the cylinder mirror 24 and the concave mirror 25, and is collected on an image forming surface of the DMD 12 where an image is formed.

Next, the image forming unit 10 will be described.

Figure 8:
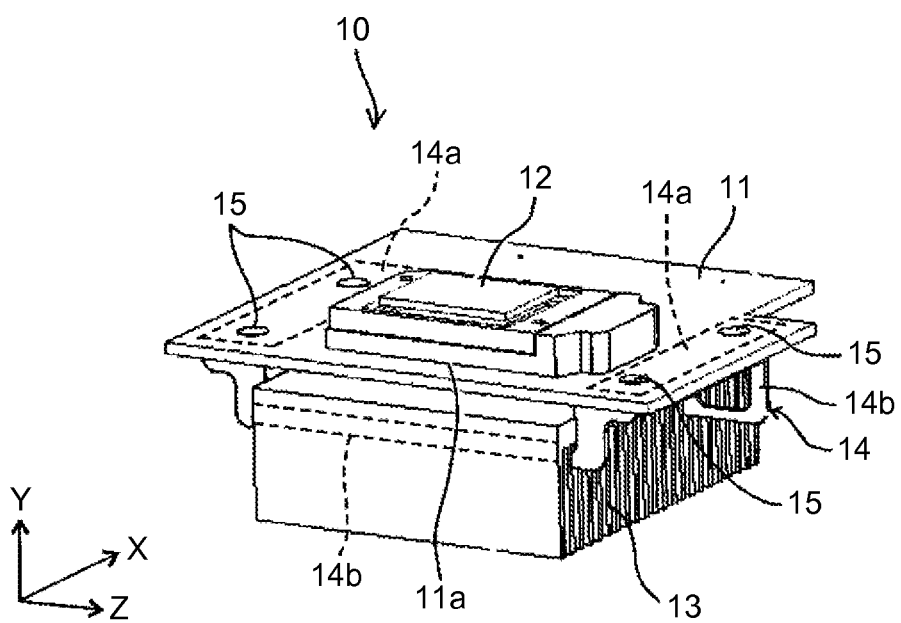
FIG. 8 is perspective view illustrating the image forming unit.

FIG. 8 perspectively illustrates the image forming unit 10.

As illustrated in FIG. 8, the image forming unit 10 is provided with a DMD board 11 to which the DMD 12 is mounted. The DMD 12 is attached to a socket 11a formed on the DMD board 11 so that the image forming surface in which micromirrors are arranged in an array (grid) faces upward. The DMD board 11 is provided with a drive circuit and the like for driving the DMD mirror. A heat sink 13 as a cooling unit to cool down the DMD 12 is fixed to a back side (an opposite side of the socket 11a formed side) of the DMD board 1. A portion of the DMD board 11 to which the DMD 12 is mounted is opened through. The heat sink 13 is provided with a protrusion portion 13a (see FIG. 7) which engages with the through hole of the DMD board 11. A leading head of the protrusion portion 13a is flattened. This protrusion portion 13a is inserted into the through hole of the DMD board 11, so that the flat portion at the leading edge of the protrusion portion 13a abuts on the back surface (the opposite surface of the image forming surface) of the DMD 12. It is possible to improve the adhesiveness and thermal conductivity between the flat portion of the protrusion portion 13a and the back surface of the DMD 12 by applying an elastically deformable heat transfer sheet to the flat portion and/or a portion of the back surface of the DMD 12 on which the heat sink 13 abuts.

By a fix unit 14, the heat sink 13 is pressured and fixed to the DMD board 11 at a side opposite to a side which the socket 11a is formed. The fix unit 14 includes plate-like fix portions 14a. One of the plate-like portions 14a faces the back surface of the DMD board 11 at a right side in the figure. The other plate-like portion 14a faces the back surface of the DMD board 11 at a left side in the figure. Pressure portions 14b are disposed near both ends in X direction of each fix portion 14a so that right and left fix portions 14a are connected.

The heat sink 13 is pressured and fixed by the fix unit 14 to the DMD board 11 at a side opposite to a side which the socket 11a is formed, when the image forming unit 10 is screwed to the lighting bracket 26 (see FIG. 6).

Now, the fix procedure of the image forming unit 10 to the lighting bracket 26 will be described. First, the image forming unit 10 is positioned to the lighting bracket 26 so that the DMD 12 faces the opening of the lighting through hole 26d formed at the lower surface of the lighting bracket 26 of the lighting unit 20 as illustrated in FIG. 5. Next, a screw is inserted from the lower side so that the screw goes through the through hole of the fix portion 14a and the through hole of the DMD board 11. The screw is screwed into a screw hole formed at the lower side of the screw portion 262 (see FIG. 3) formed on the lighting bracket 26. As the screw is screwed into the screw portion 262 of the lighting bracket 26, the pressure portion 14b presses the heat sink 13 toward the DMD board 11. Thereby, the heat sink 13 is pressed by the fix unit 14 to a surface of the DMD board 11 opposite to a surface on which the socket 11a is formed.

Thus, the image forming unit 10 is fixed to the lighting unit 26. As illustrated in FIG. 5, three legs 29 also support the weight of the image forming unit 10.

In the image forming surface of the DMD 12, a plurality of movable micromirrors are arranged in an array (grid). Each of micromirrors can tilt its mirror surface by a predetermined angle around a torsion axis. Thus, each of micromirrors can take ON position or OFF position. If a micromirror is at ON position, the light from the light source 61 is reflected to the first optical system 70 (see FIG. 2), as illustrated by an arrow L2 in FIG. 7. If a micromirror is at OFF position, the light from the light source 61 is reflected to the OFF light plate 27 (see an arrow L1 in FIG. 7) held at the lateral side of the lighting bracket 26 as illustrated in FIG. 6. Therefore, by driving each mirror independently, it is possible to control the light projection for each pixel of the image data and thus form the image.

The light reflected to the OFF light plate 27 is absorbed as heat and then cooled by an ambient air flow.

Next, the first optical unit 30 will be described.

Figure 9:
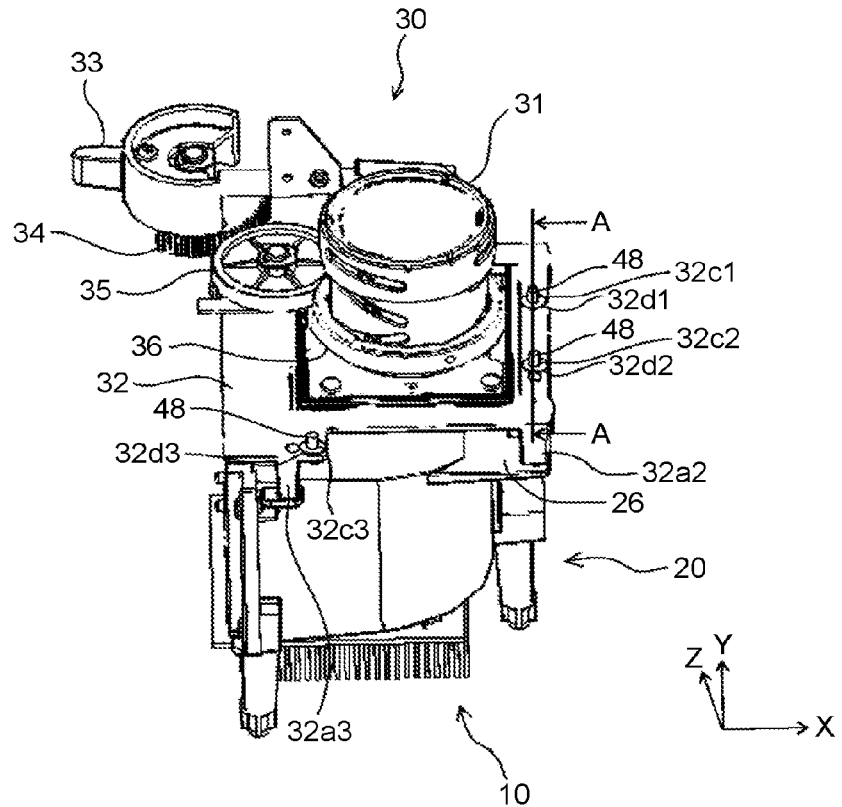
FIG. 9 is a perspective view illustrating a first optical unit with the lighting unit and the image forming unit.

FIG. 9 perspectively illustrates the first optical unit 30 with the lighting unit 20 and the image forming unit 10.

As illustrated in FIG. 9, the first optical unit 30 is disposed above the lighting unit 20. The first optical unit 30 is provided with the projection lens unit 31 holding the first optical system 70 (see FIG. 2) including a plurality of lenses, and the lens holder 32 for holding this projection lens unit 31.

The lens holder 32 has four legs 32a1 to 32a4 extending downward (in FIG. 9, only legs 32a2 and 32a3 are illustrated. The leg 32a1 is illustrated in FIG. 3, and the leg 32a4 is illustrated in FIG. 5). A screw hole is formed at a bottom surface of each of legs 32a1 to 32a4, for screwing each leg is screwed to the lighting bracket 26.

The projection lens unit 31 is provided with a focus gear 36 with which an idle gear 35 engages. The idle gear 35 engages with a lever gear 34. A focus lever 33 is fixed to a rotational axis of the lever gear 34. The leading edge of the focus lever 33 is exposed from the main body as illustrated in FIG. 1.

When the focus lever 33 is moved, the focus gear 36 is rotated via the lever gear 34 and the idle gear 35. When the focus gear 36 is rotated, the plurality of lenses composing the first optical system 70 in the projection lens unit 31 is moved to predetermined directions so that a focus of the projection image is adjusted.

The lens holder 32 has four screw through holes 32c1 to 32c4 through which screws 48 penetrate for screwing the second optical unit 40 to the first optical unit 30 (in FIG. 9, three screw through holes 32c1 to 32c3 are illustrated. Each of three screw through holes is illustrated in a state that a screw 48 is penetrated. The edge of the screw 48 is viewed in the figure.) Around each of screw through holes 32c1 to 32c4, the second optical unit positioning protrusions 32d1 to 32d4 protruded from the surface of the lens holder 32 are formed (in FIGS. 9, 32d1 to 32d3 are illustrated).

Figure 10:
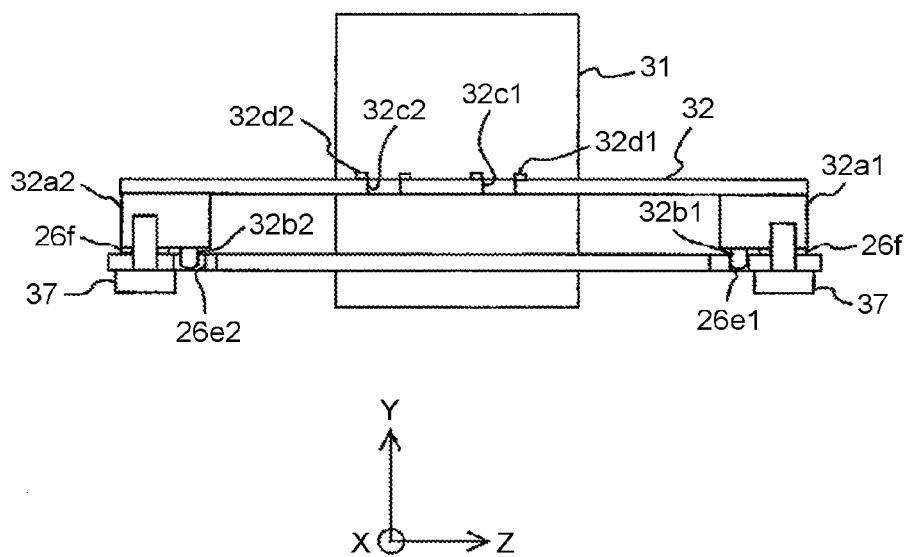
FIG. 10 is a section along A-A line in FIG. 9.

FIG. 10 is a sectional view along A-A line in FIG. 9.

As illustrated in FIG. 10, legs 32a1 and 32a2 are provided with positioning joint protrusions 32b1 and 32b2, respectively. The positioning joint protrusion 32b1 at the right side in the figure is inserted into the round hole shaped positioning hole 26e1 which is formed as the main reference at the upper plate 26b of the lighting bracket 26. The positioning joint protrusion 32b2 at the left side in the figure is inserted into the elongate hole shaped positioning hole 26e2 which is formed as the sub reference on the upper plate 26b of the lighting bracket 26. Thus, the positioning in Z direction and X direction is done. Screws 37 are inserted into through holes 26c1 to 26c4 formed at the upper plate 26b of the lighting bracket 26, so that screws 37 are screwed into screw holes formed on each of legs 32a1 to 32a4 of the lens holder 32, and the first optical unit 70 is positioned and fixed to the lighting unit 20.

The upper portion of the projection lens unit 31 above the lens holder 32 is covered by a mirror holder 45 (see FIG. 12) of the second optical unit, which will be described later. As illustrated in FIG. 3, below the lens holder 32 of the projection lens unit 31, a portion of the projection lens unit 31 between the lens holder 32 and the upper plate 26b of the lighting bracket 26 of the lighting unit 20 is exposed. However, the light cannot enter from this exposed portion to the light path of the image, since the projection lens unit 31 engages with the lens holder 32.

Next, the second optical unit 40 will be described.

Figure 11:
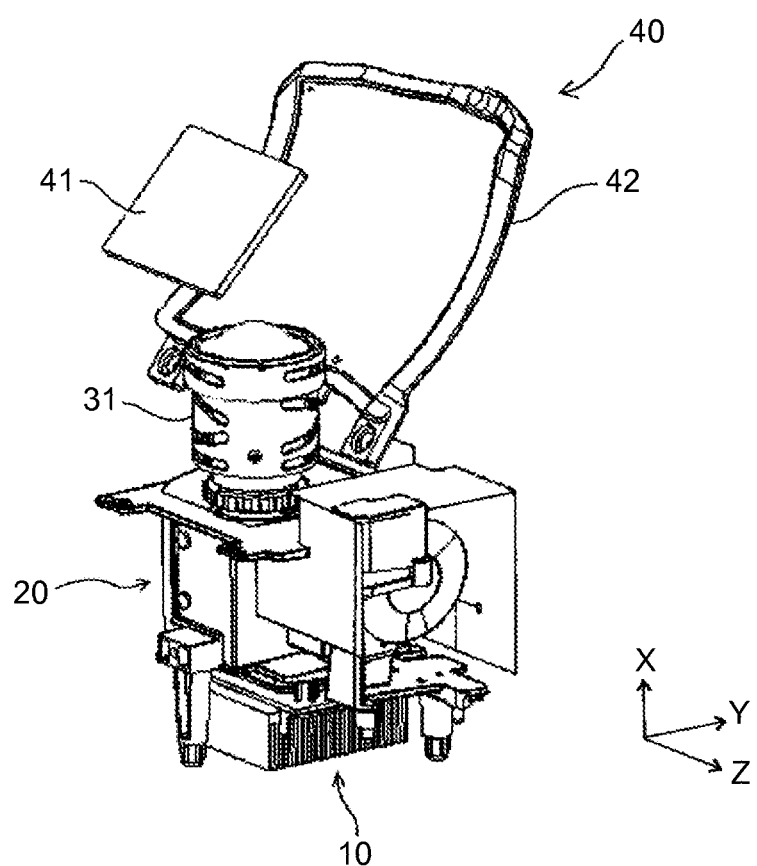
FIG. 11 is a perspective view illustrating a second optical system held by a second optical unit, with the projection lens unit, the lighting unit and the image forming unit.

FIG. 11 perspectively illustrates the second optical system included in the second optical unit 49, while also illustrating the projection lens unit 31, the lighting unit 20 and the image forming unit 10.

As illustrated in FIG. 11, the second optical unit 40 is provided with the reflecting mirror 41 composing the second optical system, and the concave shaped curved mirror 42. A reflecting surface of the curved mirror 42 may be a spherical surface, a rotationally symmetric aspheric surface, a free curved surface or the like.

Figure 12:
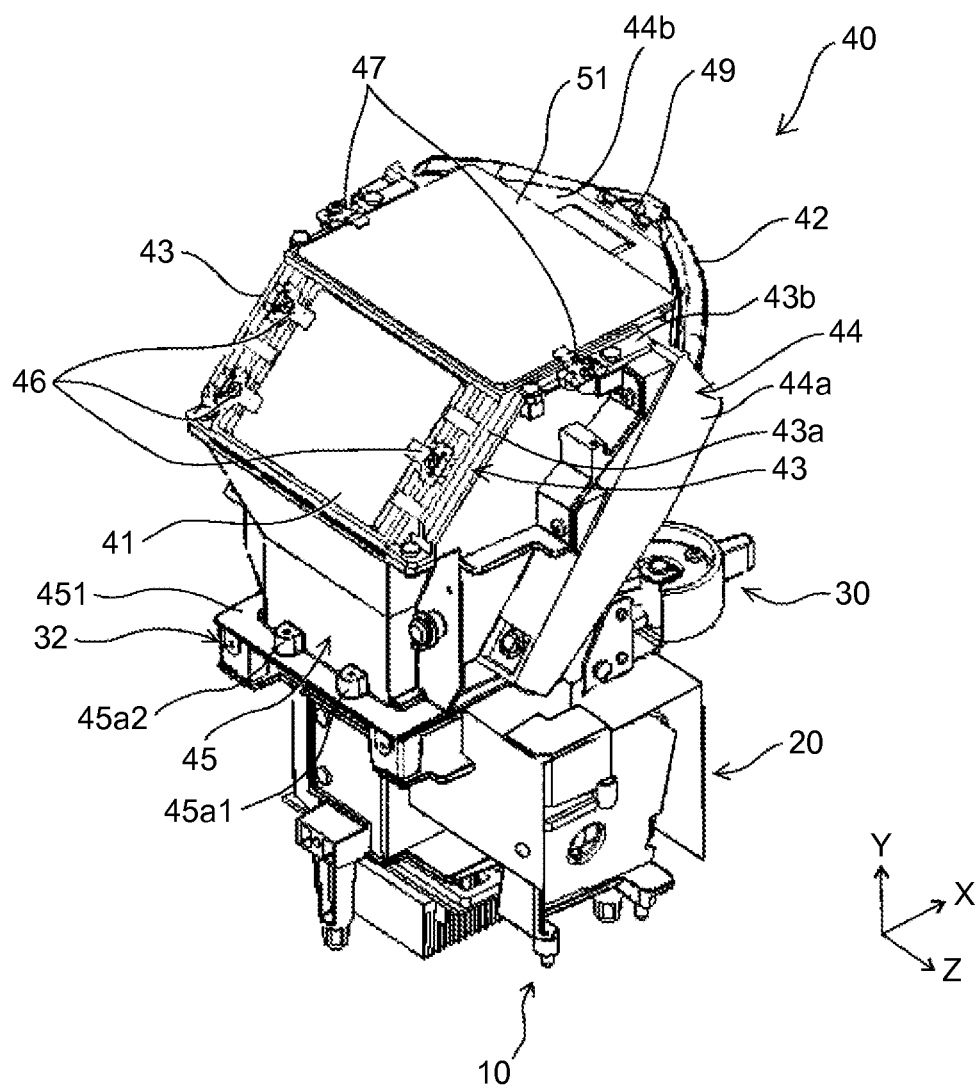
FIG. 12 is a perspective view illustrating the second optical unit with the first optical unit, the lighting unit, and the image forming unit.

FIG. 12 perspectively illustrates the second optical unit 40 with the first optical unit 30, the lighting unit 20, and the image forming unit 10.

As illustrated in FIG. 12, the second optical unit 40 is provided with a transmissive glass 51 for transmitting the light image reflected from the curved mirror 42 and for protecting optical components in the unit from dust.

The second optical unit 40 includes a mirror bracket 43 for holding the reflecting mirror 41 and the transmissive glass 51, a free mirror bracket 44 for holding the curved mirror 42, and the mirror holder 45 to which the mirror bracket 43 and the free mirror bracket 44 are attached.

The mirror holder 45 has a box shape. Specifically, it has a U shape when viewed from the upper side in which the upper side, the bottom side, and the depth side of X direction in the figure of the box are opened. Edge portions of the upper opening of the mirror holder 45 extend from the front side to the depth side in X direction at the front side and the depth side in Z direction. Each of these edge portions has an inclined portion and a parallel portion. The inclined portion inclines so that it is raised as it goes to the depth in X direction in the figure. The parallel portion is parallel to X direction in the figure. The inclined portion is on the front side of the parallel portion in X direction. An edge portion of the upper opening of the mirror holder 45 extending in Z direction at the front side in X direction in the figure is parallel to Z direction in the figure.

The mirror bracket 43 is attached to the upper part of the mirror holder 45. The mirror bracket 43 has an inclined surface 43a and a parallel surface 43b. The inclined surface 43a abuts on the inclined portion of the upper opening edges of the mirror holder 35, and inclines so that it is raised as it goes to the depth in X direction in the figure. The parallel surface 43b, which is parallel to X direction, abuts on the parallel portion of the upper opening edges of the mirror holder 45. The inclined surface 43a and the parallel surface 43b have openings, respectively. In these openings, the reflecting mirror 41 is held so that the opening of the inclined surface 43a is closed, and the transmissive glass 51 is held so that the opening of the parallel surface 43b is closed.

The reflecting mirror 41 is positioned and fixed to the inclined surface 43a of the mirror bracket 43 by pressing Z direction both ends of the reflecting mirror 41 against the inclined surface 43a of the mirror bracket 43 by a flat spring-like mirror pressing members 46. One Z direction end of the reflecting mirror 41 is fixed by two mirror pressing members 46, and the other Z direction end of the reflecting mirror 41 is fixed by one mirror pressing member 46.

The transmissive glass 51 is positioned and fixed to the mirror bracket 43 by pressing Z direction both ends of the transmissive glass 51 against the parallel surface 43b of the mirror bracket 43 by a flat spring-like glass pressing members 47. Each Z direction end of the transmissive glass 51 is fixed by one glass pressing member 47, respectively.

The free mirror bracket 44 for holding the curved mirror 42 has arms 44a at Z direction both sides thereof. Each of arms 44a declines so that it is lowered as it goes to the front side from the depth side in X direction in the figure. The free mirror bracket 44 also has a connecting portion 44b for connecting two arms 44a at an upper side of two arms 44a. With regard to this free mirror bracket 44, arms 44a are attached to the mirror holder 45 so that the curved mirror 42 covers the X direction depth side opening of the mirror holder 45.

The curved mirror 42 is fixed in such a manner that a substantial central portion of the transmissive glass side end of the curved mirror 42 is pressed against the connecting portion 44b of the free mirror bracket 44 by a plate spring-like free mirror pressing member 49, and Z direction both ends of the curved mirror 42 on the first optical system side are fixed to arms 44a of the free mirror bracket 44 by screws.

The second optical unit 40 is stacked on and fixed to the lens holder 32 of the first optical unit 30. Specifically, an under surface 451 is formed under the mirror holder 45 which faces the upper surface of the lens holder 32. The under surface 451 has four cylindrical screw joints 45a1 to 45a4 (only 45a1 and 45a2 are illustrated in FIGS. 12, and 45a3 is illustrated in FIG. 3) formed for screwing the second optical unit 40 to the first optical unit 30. The second optical unit 40 is fixed to the first optical unit 30 in such a manner that screws 48 are penetrated through screw holes 32c1 to 32c4 formed on the lens holder 32 of the first optical unit 30, and then screwed and fastened into screw joints 45a1 to 45a4. At this time, the under surface of the mirror holder 45 of the second optical unit 40 abuts on the second optical unit positioning protrusions 32d1 to 32d4 of the lens holder 32, so that the second optical unit 40 is positioned in Y direction and fixed.

When the second optical unit 40 is stacked on and fixed to the lens holder 32 of the first optical unit 30, the upper portion of the projection lens unit 31 above the lens holder 32 as illustrated in FIG. 9 is housed in the mirror holder 45 of the second optical unit 40. When the second optical unit 40 is stacked on and fixed to the lens holder 32 of the first optical unit 30, a gap is made between the curved mirror 42 and the lens holder 32. The idle gear (see FIG. 9) is inserted into the gap.

Figure 13:
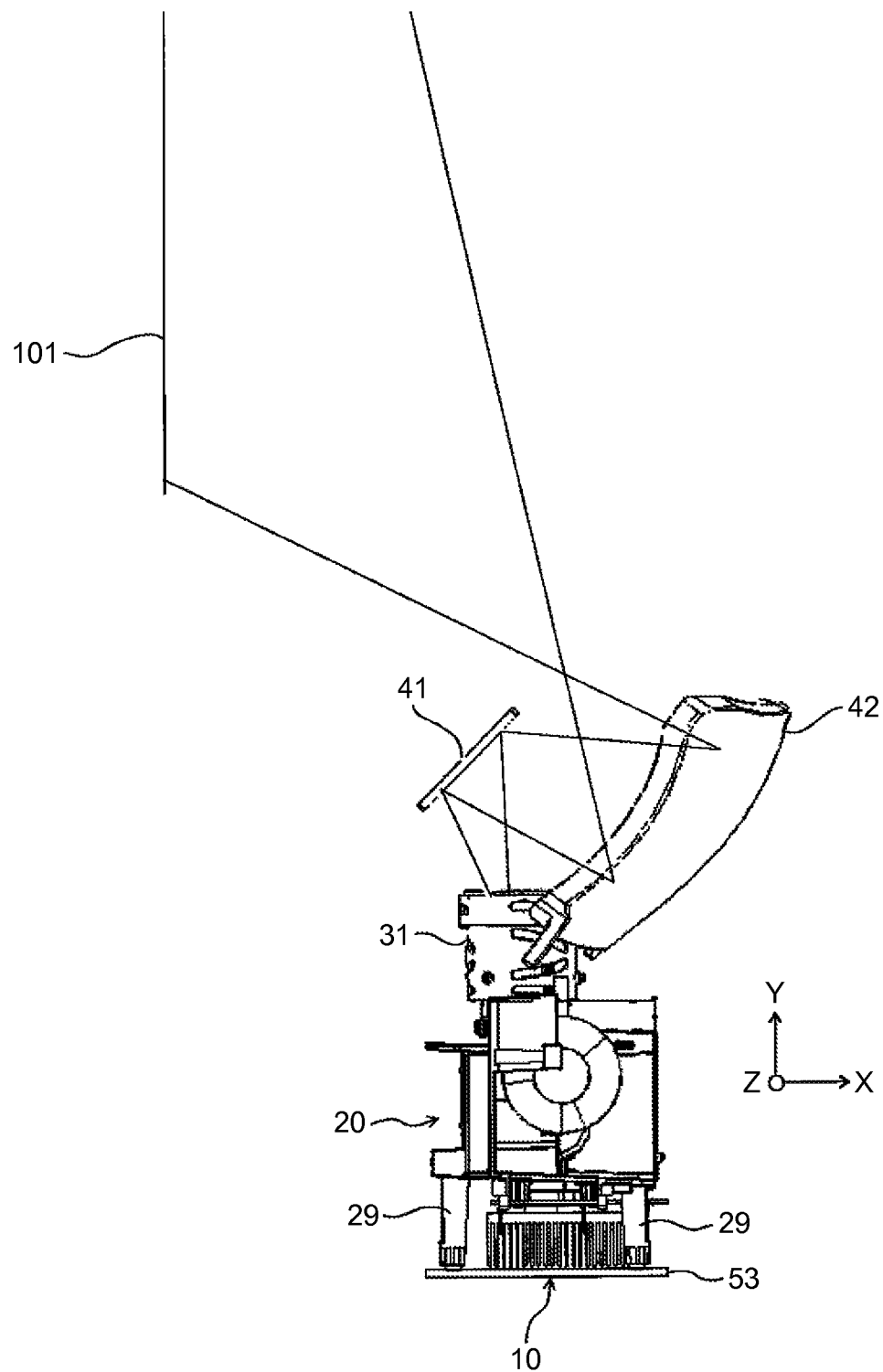
FIG. 13 is a perspective view illustrating light paths from the first optical system to the projection plane.

FIG. 13 perspectively illustrates the light paths from the first optical system 70 to the projection plane 101 (screen).

The light beam passed through the projection lens unit 31 composing the first optical system 70 forms an intermediate image conjugate to the image formed on the DMD 12 between the reflecting mirror 41 and the curved mirror 42. This intermediate image is formed as a curved mirror image between the reflecting mirror 41 and the curved mirror 42. Next, the diverging light after forming the intermediate image enters the concavely curved mirror 42 to become a convergent light. By this convergent light through the curved mirror 42, the intermediate image becomes a "further enlarged image" to be projected and formed on the projection plane 101.

Thus, owing to the structure in which the projection optical system is composed of the first optical system 70 and the second optical system, the intermediate image is formed between the first optical system 70 and the curved mirror 42 of the second optical system, and the intermediate image is enlarged and projected by the curved mirror 42, the projection distance can be shortened. Thus, the projectors can be used in small rooms.

As illustrated in FIG. 13, the first optical unit 30 and the second optical unit 40 are stacked on and fixed to the lighting bracket 26. Furthermore, the image forming unit 10 is also fixed. Therefore, legs 29 of the lighting bracket 26 are fixed to the base component 53 so that the legs 29 support weights of the first optical unit 30, the second optical unit 40 and the image forming unit 10.

Figure 14:
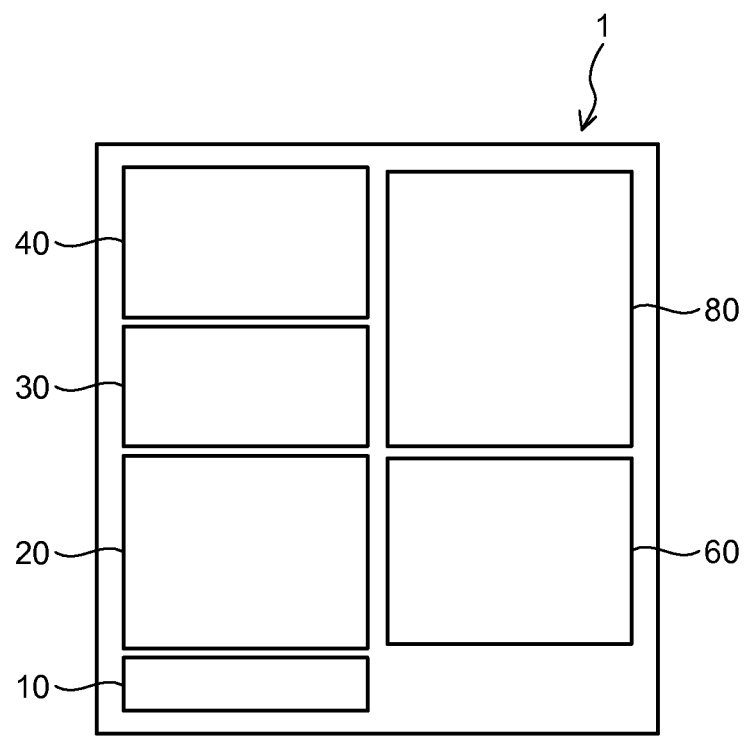
FIG. 14 is a schematic view illustrating an arrangement of units in the apparatus.
Figure 14:
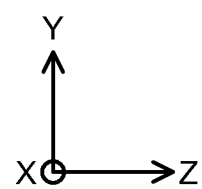

FIG. 14 schematically illustrates an arrangement of units in the projector.

As illustrated in FIG. 14, the image forming unit 10, the lighting unit 20, the first optical unit 30 and the second optical unit 40 are arranged in a stacked manner in Y direction which is a short axis direction of the projection plane. Relative to stacked units of the image forming unit 10, the lighting unit 20, the first optical unit 30 and the second optical unit 40, the light source unit 60 is disposed in Z direction which is a long axis direction of the projection plane. Thus, in the present embodiment, the image forming unit 10, the lighting unit 20, the first optical unit 30, the second optical unit 40 and the light source unit 60 are arranged in Y direction and Z direction which are parallel to the projection plane 101. More specifically, the image forming unit 10 and the lighting unit 20 form the image forming part A, while the first optical unit 30 and the second optical unit 40 form the projection optical part B. The light source unit 60 is connected to the image forming part A in a direction perpendicular to a direction in which the image forming part A and the projection optical part B are stacked. The image forming part A and the light source unit 60 are arranged along the same line parallel to the base component 53. The image forming part A and the projection optical part B are arranged along the same line perpendicular to the base component 53, in the order of the image forming part A and the projection optical part B from the base component 53. Thereby, a space for installing the projector can be saved in a direction orthogonal to a plane of the projection image projected on the projection plane 101. Thereby, when the image projection apparatus is used on a desk or the like in a small room, an arrangement or layout of desks and/or chairs is not restricted by the apparatus.

In the present embodiment, above the light source unit 60, a power source unit 80 is stacked for supplying an electrical power to the light source 61 and the DMD 12. The light source unit 60, the power source unit 80, the image forming part A and the projection optical part B are housed in a case of the projector 1 made of an outer cover (see FIG. 19), which will be described later, covering the upper surface of the projector, the base component 53 and the surrounding of the projector 1.

Figure 15:
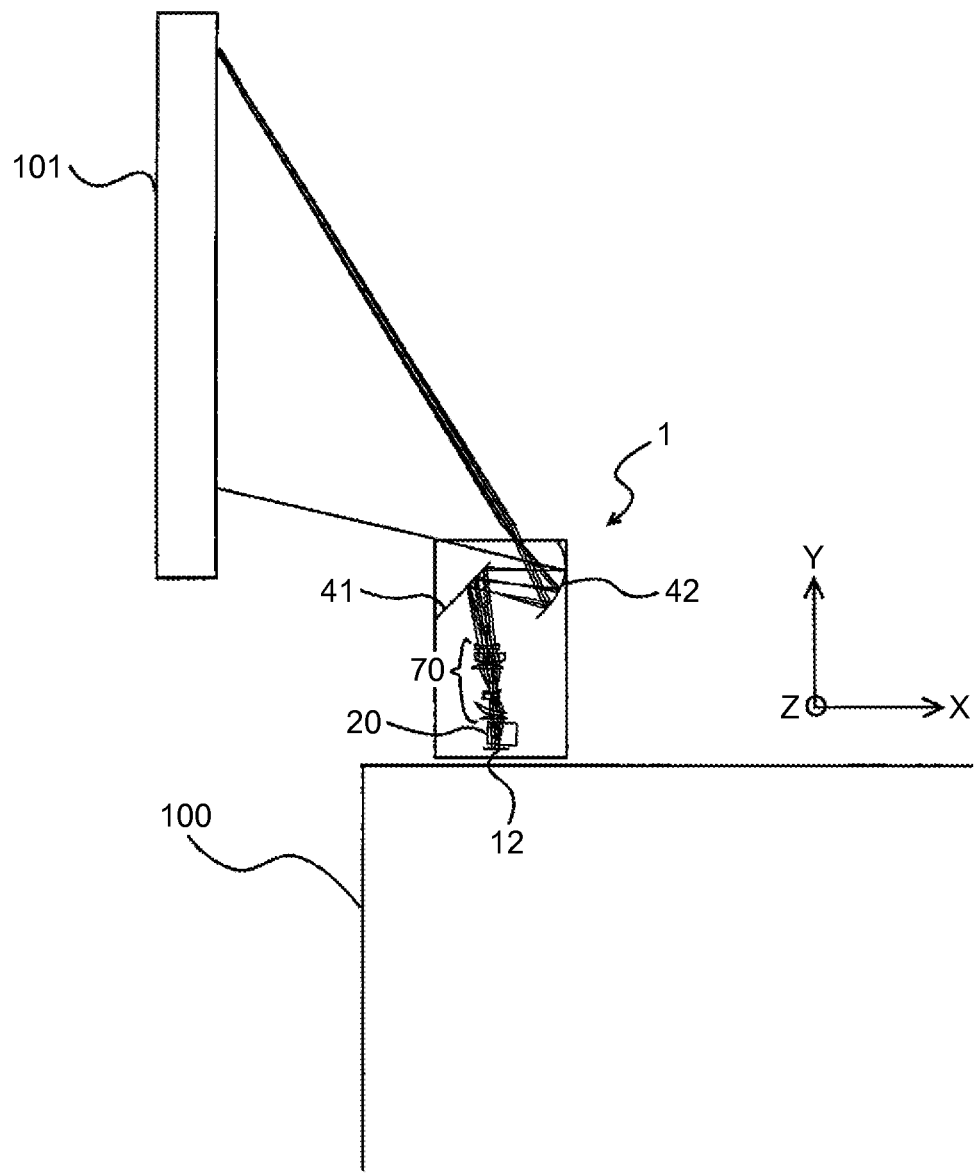
FIG. 15 is a usage example of the projector according to the embodiment.
Figure 16:
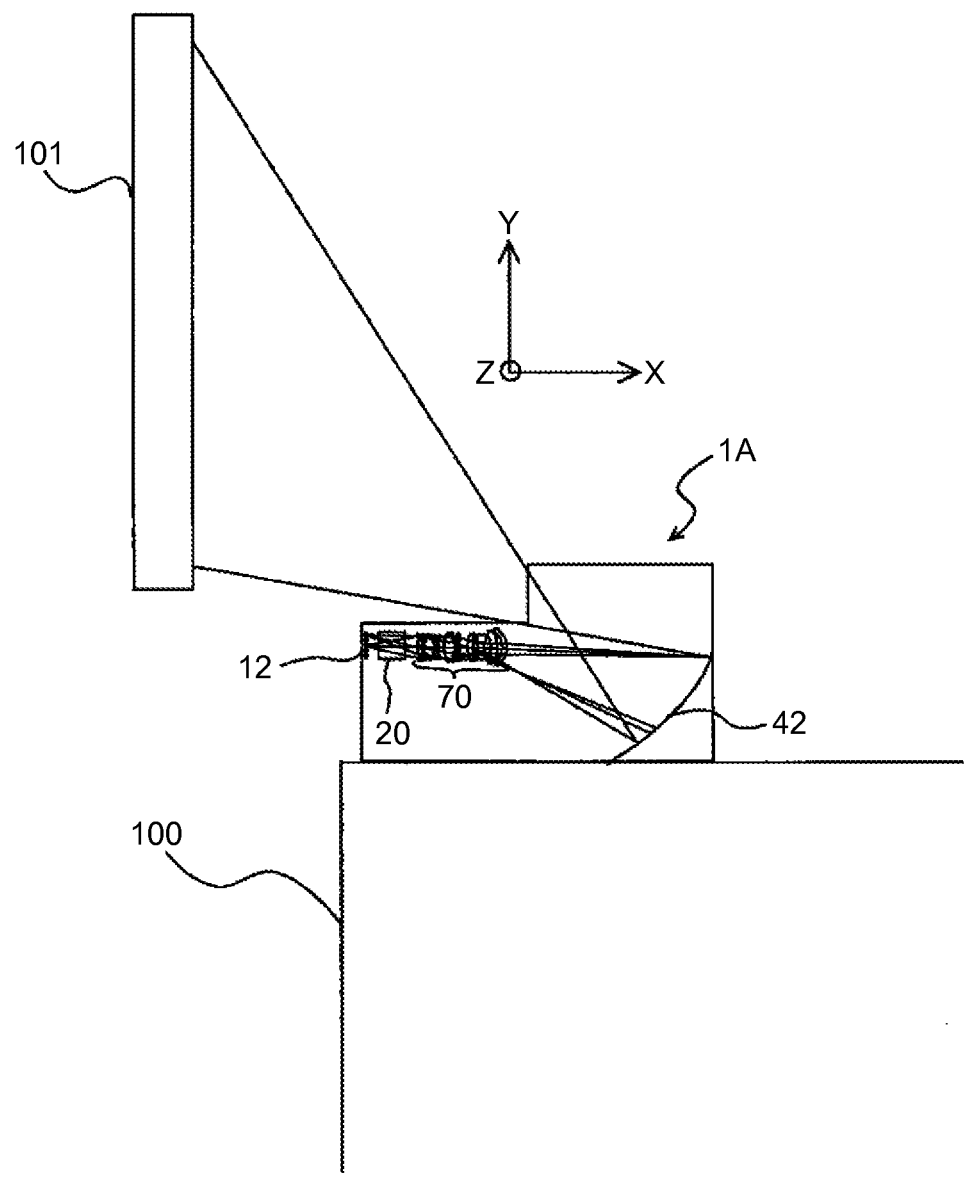
FIG. 16 is a usage example of a conventional projector.
Figure 17:
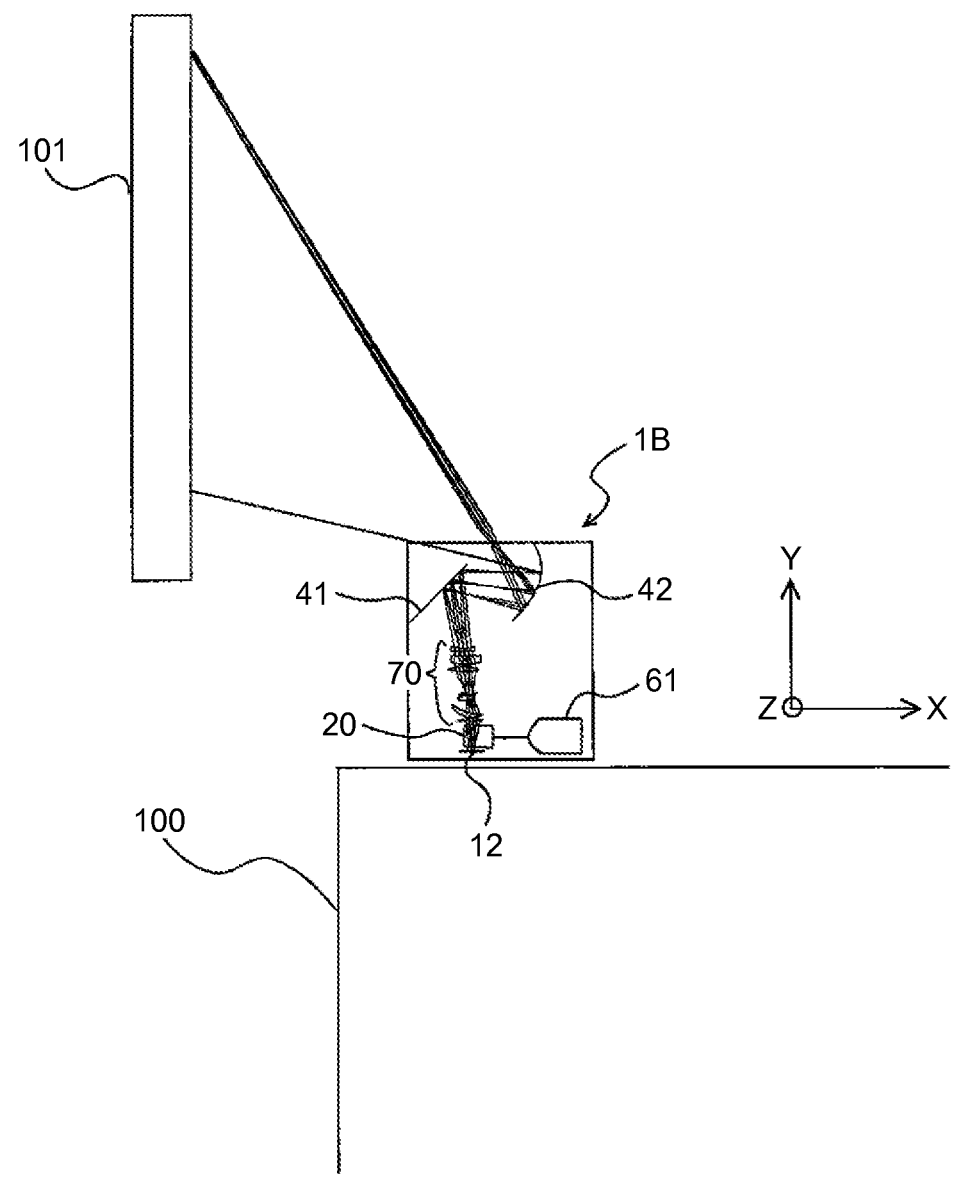
FIG. 17 is a usage example of another conventional projector.

FIG. 15 illustrates an example of usage of the projector 1 according to the present embodiment. FIG. 16 and FIG. 17 illustrate examples of usage of conventional projectors 1A and 1B.

As illustrated in FIG. 15 to FIG. 17, the projector 1 is used in such a manner that the projector 1 is put on a table 100 and an image is projected on the projection plane 101 such as a white board, when used in a meeting room for example.

As illustrated in FIG. 16, in the conventional projector 1A, a DMD 12 (image forming element), a lighting unit 20, a first optical system 70, and a second optical system (curved mirror 42) are arranged in series in a direction orthogonal to a plane of a projection image. Therefore, the projector 1A is elongated in the direction (X direction) orthogonal to the projection plane of the projector 1A. Thus, the projector 1A occupies a space in the direction orthogonal to the projection plane 101. Desks and chairs used by viewers of the image projected on the projection screen 101 are generally arranged in the direction orthogonal to the projection plane. Thus, if the projector occupies the space in the direction orthogonal to the projection plane, the layout space allowed for desks and chairs is limited. It is inconvenient.

In the projector 1B illustrated in FIG. 17, a DMD 12 (image forming element), a lighting unit 20 and a first optical system 70 are arranged in series parallel to a plane of a projection image. Therefore, in comparison with the projector 1A illustrated in FIG. 18, a length in a direction orthogonal to the projection plane 101 can be shortened. However, in the projector 1B illustrated in FIG. 17, relative to the lighting unit 20, a light source 61 is arranged in the direction orthogonal to the plane of the projection image. Therefore, the length in the direction orthogonal to the projection plane 101 of the projector cannot be sufficiently shortened.

On the other hand, in the projector 1 according to the present embodiment illustrated in FIG. 15, the image forming part A composed of the image forming unit 10 and the lighting unit 20 and the projection optical part B composed of the first optical unit 30 and the reflecting mirror 41 are arranged in series along Y direction in the figure among directions parallel to the projection plane 101 and the image plane of the projection image projected on the projection plane 101. Furthermore, the light source unit 60 and the lighting unit 20 are arranged in series along Z direction in the figure among directions parallel to the plane of the projection image projected on the projection plane 101. Namely, the projector 1 according to the present embodiment has a configuration in which the light source unit 60, the image forming unit 10, the lighting unit 20, the first optical unit 30, and the reflecting mirror 41 are arranged in directions (Z and Y directions in the figure) parallel to the plane of the projection image projected on the projection plane 101. Each of the light source unit 60, the image forming unit 10, the lighting unit 20, the first optical unit 30, and the reflecting mirror 41 is arranged parallel to the projection plane and the image plane of the projection image. Thus, since the light source unit 60, the image forming unit 10, the lighting unit 20, the first optical unit 30, and the reflecting mirror 41 are arranged in directions (Z and Y directions in the figure) parallel to the plane of the projection image projected on the projection plane 101, a length in a direction (X direction in the figure) orthogonal to the projection plane 101 can be shortened as illustrated in FIG. 15, in comparison with projectors illustrated in FIG. 16 and FIG. 17. Thereby, the projector 1 cannot be an obstacle for the layout of desks and chairs in view of spaces. Thus, it is possible to provide the convenient projector 1.

In the present embodiment, as illustrated in FIG. 14, above the light source unit 60, the power source unit 80 for supplying the electric power to the light source 61 and the DMD 12 are disposed in a stacked manner. Thereby, a length of the projected 1 in Z direction is shortened.

Figure 18:
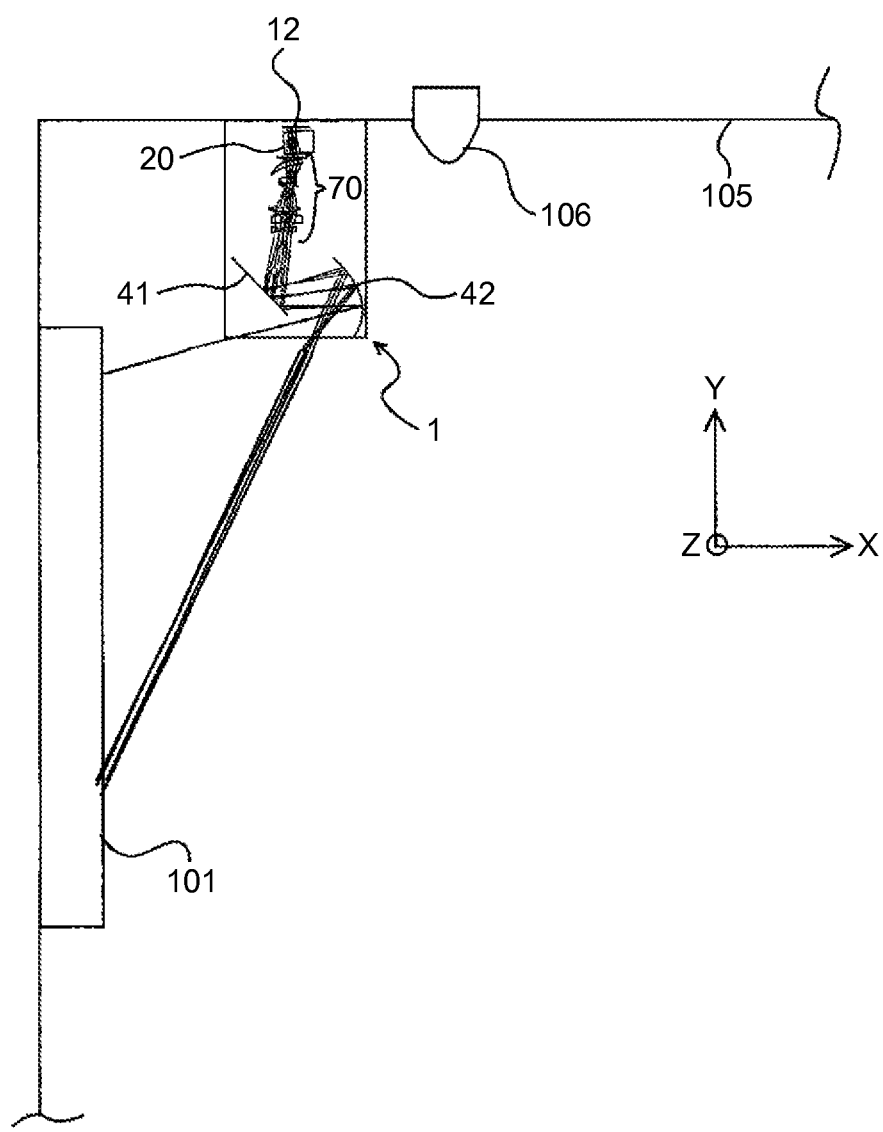
FIG. 18 is another usage example of the projector according to the embodiment.

FIG. 18 illustrates another example of usage of the projector 1 according to the present embodiment.

As illustrated in FIG. 18, the projector 1 according to the present embodiment can be used by hanging from a ceiling 105. Also in this case, the length of the projector 1 in the direction orthogonal to the projection plane 101 is short. Therefore, when the projector 1 is installed at the ceiling 105, the projector 1 can be installed without affecting a lighting equipment 106 disposed on the ceiling 105.

In the present embodiment, the second optical system is composed of the reflecting mirror 41 and the curved mirror 42. However, the second optical system may be composed only of the curved mirror 42. The reflecting mirror may be a flat mirror, a mirror having a positive refractive power, or a mirror having a negative refractive power. In the present embodiment, the concave mirror is used as the curved mirror 42. However, a convex mirror may be used. In this case, the first optical system 70 is configured so that an intermediate image is not formed between the first optical system 70 and the curved mirror 42.

The light source 61 is to be replaced periodically, since its life time comes after use over time. For this purpose, in the present embodiment, the light source unit 60 is arranged detachably from and attachably to the main body.

Figure 19:
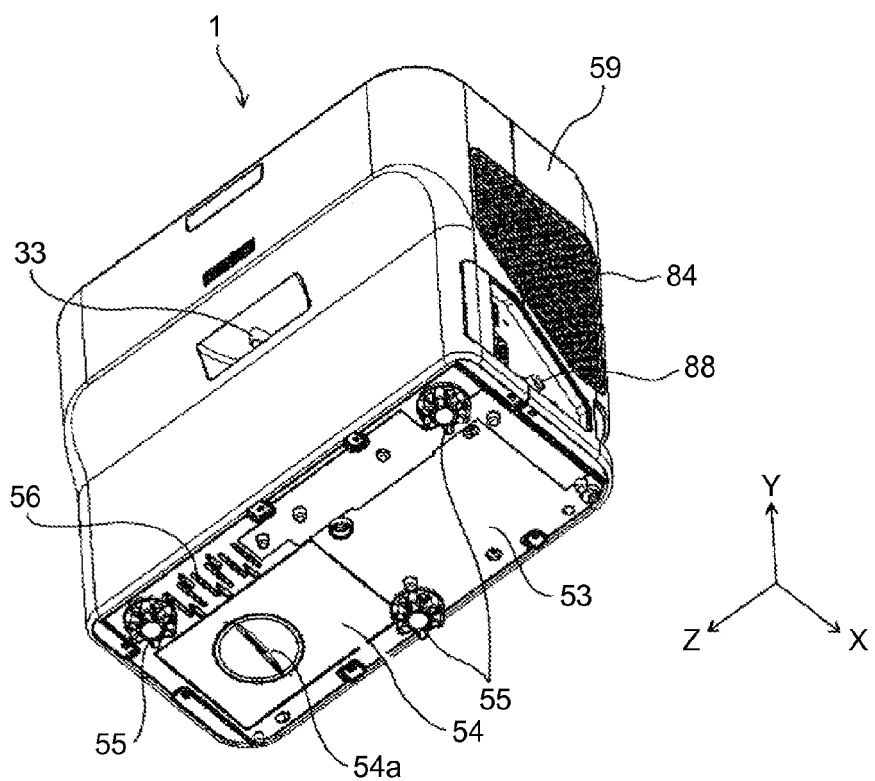
FIG. 19 is a perspective view illustrating the projector, viewed from an installation side.

FIG. 19 perspectively illustrates an installation side of the projector 1.

As illustrated in FIG. 19, the base component 53 constituting the bottom surface of the projector 1 is provided with an access cover 54 (openable/closeable cover). The access cover 54 is provided with a rotating operating member 54a. The rotating operating member 54a can be rotated to release the lock between the access cover 54 and the main body, so that the access cover can be removed from the main body. Electrical power air inlets 56 are disposed adjacent in X direction to the access cover 54 of the base component 53.

As illustrated in FIG. 19, in one of XY planes of an outer cover 59 of the projector 1, an air inlet 84, and an external input portion 88 from which the image data or the like is input from an external device such as a PC are disposed.

Figure 20:
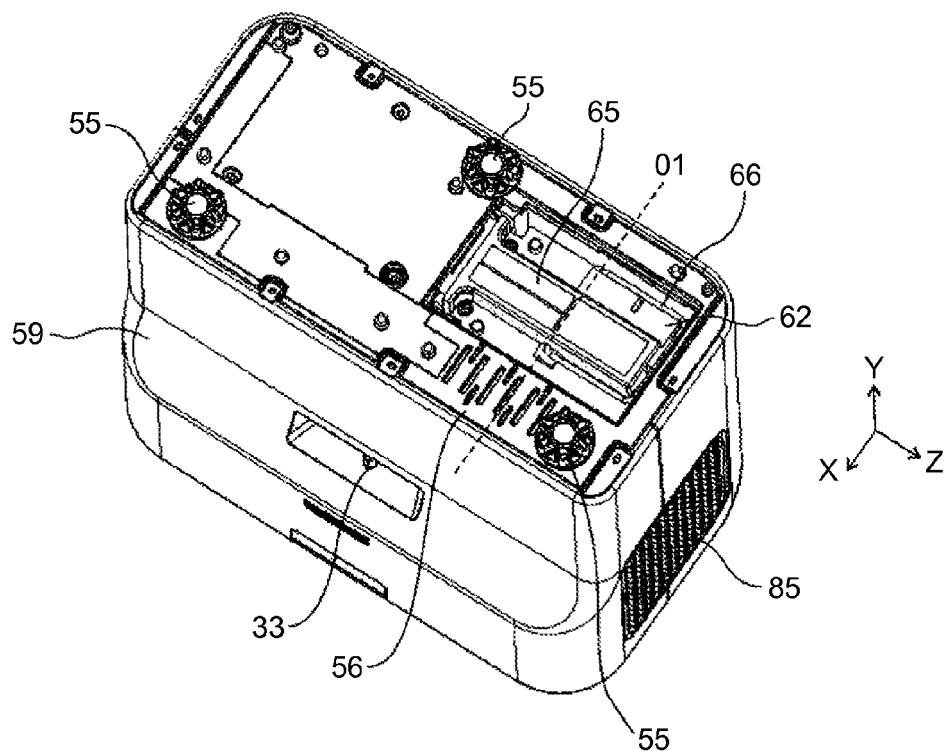
FIG. 20 is a perspective view illustrating a state that an access cover is removed from the apparatus.

FIG. 20 perspectively illustrates a state that the access cover 54 is removed from the main body.

If the access cover 54 is removed, a side of the light source bracket 62 opposite to a side on which the light source 61 is mounted in the light source unit 60 is exposed. To the light source bracket 62, a handle portion 66 is rotatably attached, so that the handle portion 62 can rotate relative to the light source bracket 62 around a dotted line 01.

When the light source unit 60 is to be removed from the main body, the handle portion 66 is rotated and grabbed to pull out the light source unit 60 toward the nearer side in the figure, so that the light source unit 60 is removed from the opening of the main body. When the light source unit 60 is to be mounted to the main body, the light source unit 60 is inserted from the opening of the main body. As the light source unit 60 is inserted into the main body, the connecting portion 62a as illustrated in FIG. 4 connects with the power source side connector of the main body. Three light source positioning portions 64a1 to 64a3 of the holder 64 as illustrated in FIG. 4 engage with three light source positioning joint portions 26a1 to 26a3 formed on the lighting bracket 26 of the lighting unit 20 as illustrated in FIG. 6, so that the light source unit 60 is positioned to the main body. Thus, the mounting of the light source unit 60 is completed. Then, the access cover 54 is attached to the base component 53. In the present embodiment, the light source unit 60 has the handling portion 66. However, an airflow path 65 protruded toward the access cover 54 may be used as the handling portion. Incidentally, the detail of the access cover 54 will be described later.

The base component 53 has three legs 55. By rotating these legs 55, the protruded extent of legs 55 can be changed, and the adjustment in the height direction (Y direction) can be done.

As illustrated in FIG. 20, in the other XY plane of the outer cover 59, an exhaust outlet 85 is disposed.

Figure 21:
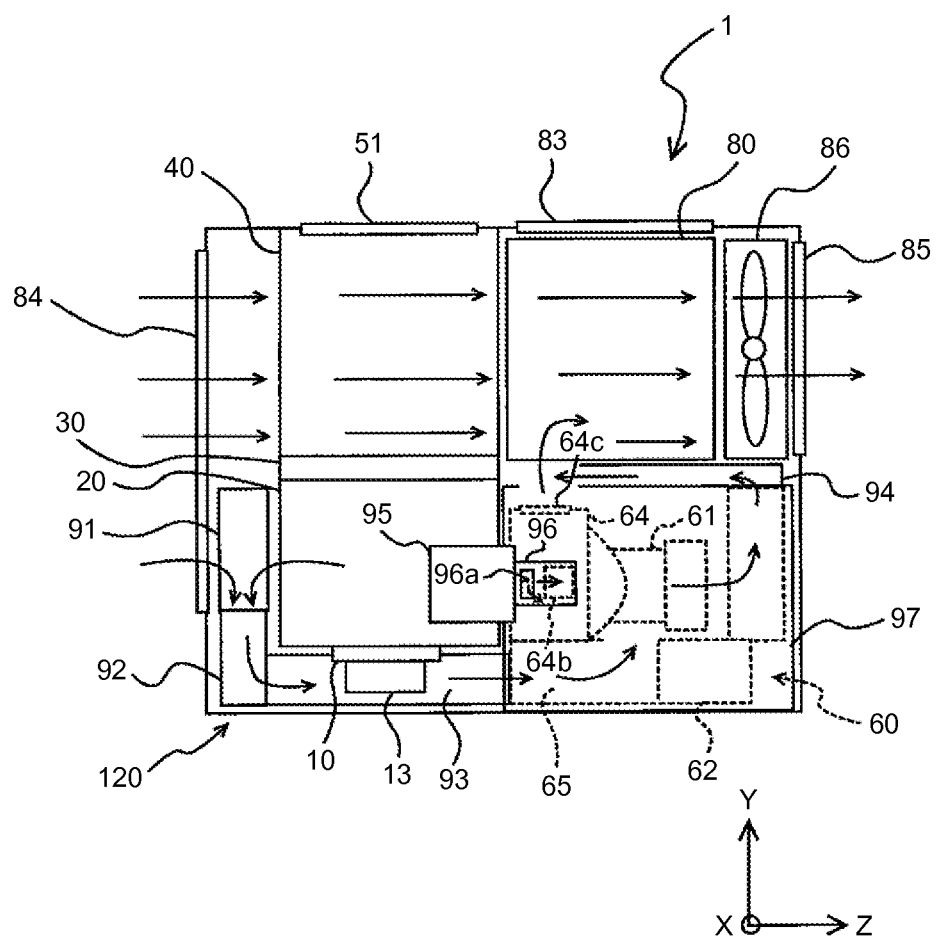
FIG. 21 is a schematic view illustrating air flows in the projector.

FIG. 21 is a view illustrating air flows in the projector 1 according to the present embodiment. In FIG. 21, the projector 1 is viewed from the direction (X direction) orthogonal to the projection plane 101.

As illustrated in FIG. 21, at one side (left side in the figure) of the projector 1, the air inlet 84 is formed for taking an ambient air into the projector 1. At another side (right side in the figure) of the projector 1, the exhaust outlet 85 is formed for discharging the air inside of the projector 1. An exhaust fan 86 is disposed so as to face the exhaust outlet 86.

The exhaust outlet 85 and a part of the air inlet 84 are located at a level between the light source unit 60 and the operating part 83, when the projector 1 is viewed from the direction (X direction) orthogonal to the projection plane 101. Thereby, the ambient air taken from the air inlet 84 flows to ZY plane of the mirror holder 45 and the back side of the curved mirror 42 of the second optical unit 40 as illustrated in FIG. 12. Along the mirror holder 45 and the back side of the curved mirror 42, the air flows toward the exhaust outlet 85. The power source unit 80 disposed above the light source unit 60 has an arch-like shape when viewed from Z direction in the figure. The air moved along the mirror holder 45 and the back side of the curved mirror 42 toward the exhaust outlet 84 flows into a space surrounded by the power source unit 80 and is then discharged from the exhaust outlet 85.

Thus, the exhaust outlet and the part of the air inlet are located at a level between the light source unit 60 and the operating part 83 when the projector 1 is viewed from the direction (X direction) orthogonal to the projection plane 101. Thereby, there is generated the airflow which flows between the light source unit 60 and the operating part 83 and is then discharged from the exhaust outlet 85.

A light source blower 95 is disposed at a position allowing for suctioning the air around the color motor 21a (see FIG. 5) to drive and rotate the color wheel 21 of the lighting unit 20. Thereby, the color motor 21a can be cooled by the airflow generated by the air suction of the light source blower 95.

The air suctioned by the light source blower 95 flows to the light source air inlet 64b (see FIG. 4) of the holder 64 through the light source duct 96. A part of the air flows into the light source duct 96 flows from an opening 96a, which is formed on the light source duct 96 on a side facing the outer cover 59 (see FIG. 19), to between the light source housing 97 and the outer cover 59.

The air flowing from the opening 96a of the light source duct 96 to between the light source housing 97 and the outer cover 59 cools down the light source housing 97 and the outer cover 59, and is then discharged from the exhaust outlet 85 by the exhaust fan 86.

The air flowing to the light source air inlet 64b flows into the light source 61. After cooling the light source 61, the air is discharged from the light source air outlet 64c formed on the upper surface of the holder 64. The air discharged from the light source air outlet 64c flows into the space surrounded by the power source unit 80 from the opening on the upper surface of the light source housing 97. Then, the air is mixed with the low temperature air which flows along the outside of the second optical unit 40 and flows into the space surrounded by the power source unit 80. Then, the air is discharged from the exhaust outlet 85 by the exhaust fan 86. Thus, the high temperature air discharged from the light source air outlet 64c is mixed with the ambient air and then discharged to the ambient. Thereby, it is possible to prevent the temperature rise of the air discharged from the exhaust outlet 85.

The operating part 83 operated by the user is preferably formed on the upper surface of the apparatus for the easy operation by the user. In the present embodiment, however, since the transmissive glass 51 is disposed on the upper surface of the projector 1 for the purpose of projecting the image on the projection plane 101, the operating part 83 needs to be disposed above the light source 61 as if they overlap each other when the projector 1 is viewed from the Y direction.

In the present embodiment, the high temperature air after cooling the light source 61 is guided to the exhaust outlet 85 by the airflow from the air inlet 84 to the exhaust outlet 85 between the light source unit 60 and the operating part 83. This high temperature air is prevented from flowing to the operating part 83. Thereby, the operating part 83 is prevented from being heated by the high temperature air after cooling the light source 61. Furthermore, a part of the air which flows from the air inlet 84 to the exhaust outlet 85 through the outside of the second optical unit 40 cools the operating part 83 by flowing beneath the operating part 83. This also contributes to the prevention of the temperature raise of the operating part 83.

Owing to the air suction of the exhaust fan 86, the ambient air is suctioned from the power source air inlets 56 formed on the base component 53 as illustrated in FIG. 19. At the X direction depth side in the figure beyond the light source housing 97, a ballast board for supplying a stable electric power (electric current) to the light source 61 is disposed. The ambient air suctioned from the power source air inlets 56 moves to upward through between the light source housing 97 and the ballast board. While this movement, the air cools the ballast board. Then, the air flows into the space surrounded by the power source unit 80 disposed above the ballast board. Then, the air is discharged from the exhaust outlet 85 by the exhaust fan 86.

In the present embodiment, the fan which generates the airflow from the air inlet 84 to the exhaust outlet 85 is disposed as the exhaust fan 86 at the exhaust side. Therefore, in comparison with a case that the fan is disposed at the air inlet side, an amount of air supplied to the inside of the apparatus from the air inlet 84 can be increased. If the fan is disposed near the air inlet 84, an amount of the ambient air flowing to the inside of the apparatus decreases because of the second optical unit 40, since the second optical unit 40 is located in a direction to which the air is directed by the fan. On the other hand, in the case that the fan is disposed as the exhaust fan 86 near the exhaust outlet 85, there is no object in a direction beyond the exhaust outlet 85, usually. Therefore, an amount of the air exhausted by the exhaust fan 86 does not decrease. Therefore, the air is taken from the air inlet 84 as much as the air exhausted by the exhaust fan 86. Consequently, an amount of the air supplied from the air inlet to the inside of the apparatus does not decrease. Therefore, it is possible to make airflow from the air inlet 84 to the exhaust outlet 85 with a predetermined pressure. Thereby, the heated air raised from the light source 61 can be advantageously directed to the exhaust outlet 85 by the airflow from the air inlet 84 to the exhaust outlet 85.

At the lower left side of the main body in the figure, a cooling unit 120 is disposed for cooling the heat sink 13 of the image forming unit 10 and the light source bracket 62 of the light source unit 60. The cooling unit 120 is provided with an air intake blower 91, a vertical duct 92, and a horizontal duct 93.

Figure 23:
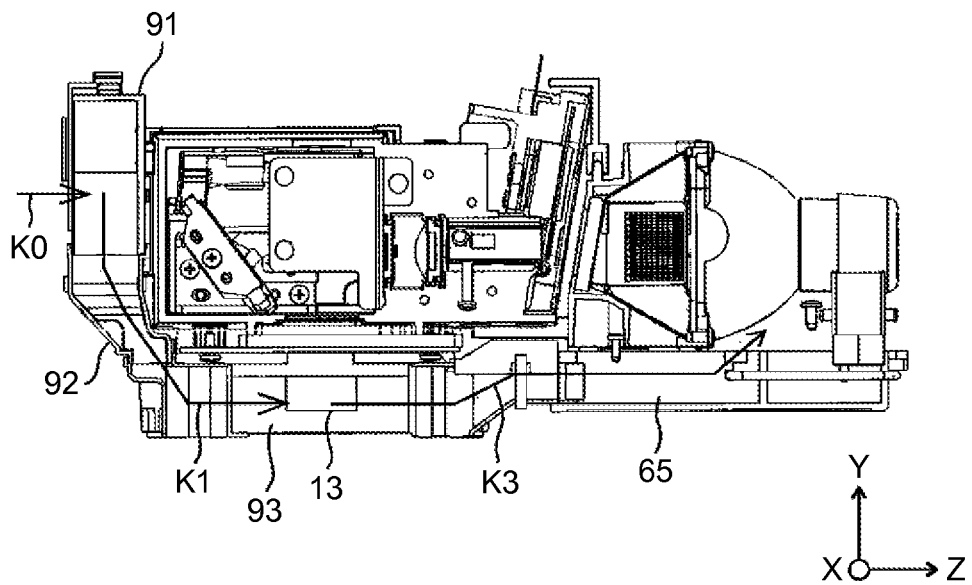
FIG. 23 is a longitudinal section of FIG. 22.

Referring to FIG. 23 also, airflow from the air intake blower 91 will be explained. The air intake blower 91 is disposed facing the air inlet 84 at the lower part of the inlet 84. The ambient air is taken from one side of the blower 91 facing the air inlet 84 through the air inlet 84. The air inside of the apparatus is taken from the other side of the blower 91 which is opposite to the one side facing the air inlet 84. The taken air is directed to the vertical duct 92 disposed under the blower 91. The air directed to the vertical duct 92 moves downward and is then directed to the horizontal duct 93 connected to the vertical duct 92 at the lower part of the duct 92.

In the horizontal duct 93, there is a heat sink 13 attached to the back side of the image forming surface of the DMD 12. The heat sink 13 is cooled by the air flowing in the horizontal duct 93. By cooling the heat sink 13, the DMD 12 can be cooled effectively. Thus, the DMD 12 can be prevented from being heated to a high temperature.

The air moved through the horizontal duct 93 flows in the airflow path 65 or the openings 65a formed in the light source bracket 62 of the light source unit 60 as illustrated in FIG. 4. The air entered the openings 65a flows to between the access cover 54 and the light source bracket 62, so that the access cover 54 is cooled.

On the other hand, the air entered the airflow path 65 cools the light source bracket 62 and then flows to a part of the light source 61 opposite to the emitting side of the light source 61, so that a part of the light source 61 opposite to the reflecting surface of the reflector 67 is cooled. Therefore, the air flowing through the air flow path 65 takes heat from both the light source bracket 62 and the light source 61. The air passed around the reflector 67 flows through an exhaust duct 94 which directs the air from a level (height) of the light source bracket 62 to a level around the lower portion of the exhaust fan 86. Then, the air combines with the air discharged from the light source air outlet 64c, and flows to the exhaust outlet 85 through a fluid guide 87. The air is discharged from the exhaust outlet 85 by the exhaust fan 86. On the other hand, the air which flows between the access cover 54 and the light source bracket 62 through the openings 65a moves inside of the apparatus after cooling the access cover 54, so that the air is discharged from the exhaust outlet 85 by the exhaust fan 86.

Figure 22:
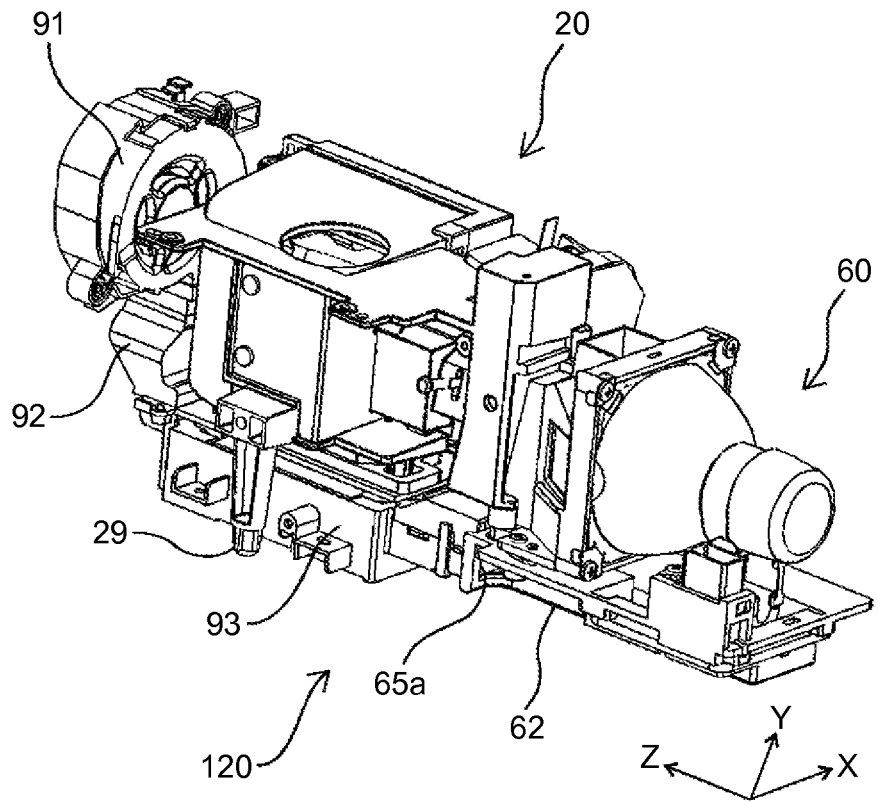
FIG. 22 is a perspective view illustrating a cooling unit to cool a DMD and the like, with the lighting unit and the light source unit.

FIG. 22 perspectively illustrates the cooling unit 120 with the lighting unit 20 and the light source unit 60. The layout of the cooling unit, the lighting unit 20, and the light source unit 60 is illustrated in FIG. 22.

As understood from FIG. 22, a space allowing for the installation of the horizontal duct 93 under the lighting unit 20 is ensured by legs 29 which support weights of the image forming unit 10, the lighting unit 20, the first optical unit 30, and the second optical unit 40.

FIG. 23 is a longitudinal section view of FIG. 22. An arrow indicates airflow from the air intake blower 91 to the vicinity of the reflector 67 through the airflow path 65. The air flowing from the air intake blower 91 flows as indicated by arrows K0, K1, and K3. The light source unit 60 is attached to the projector 1 so that the light source bracket 62 and the airflow path 65 face the base component 53. Thereby, a flow path for cooling the reflector 67 of the light source 61 and the horizontal duct 93 as a flow path for cooling the heat sink 13 are also disposed on the base component 53. Consequently, a width of the projector 1 in a direction orthogonal to the projection plane can be shortened.

Figure 24:
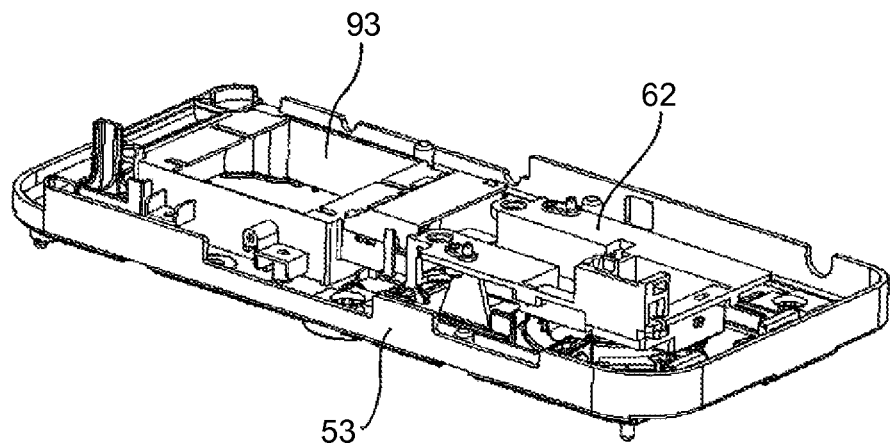
FIG. 24 is a perspective view illustrating a horizontal duct, the light source unit and a base component.

FIG. 24 perspectively illustrates the horizontal duct 93 and the light source bracket 62 on the base component 53.

As illustrated in FIG. 24, the horizontal duct 93 is fixed to the base component 53 of the projector 1. The horizontal duct 93 has an opening at a part of the upper surface thereof. The image forming unit 10 is mounted on the horizontal duct 93, so that the heat sink 13 of the image forming unit 10 is inserted in this opening.

Figure 25:
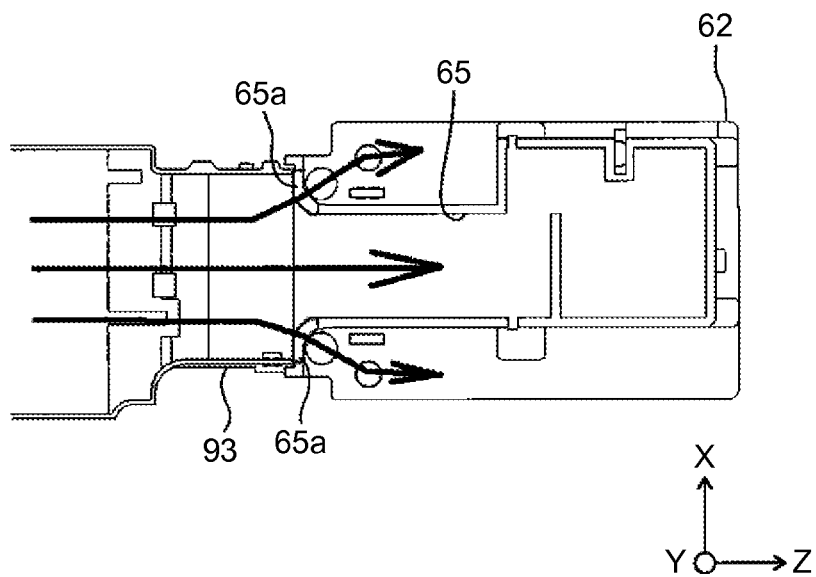
FIG. 25 is a schematic view illustrating air flows from the horizontal duct to a light source bracket, viewed from a lower side.
Figure 26:
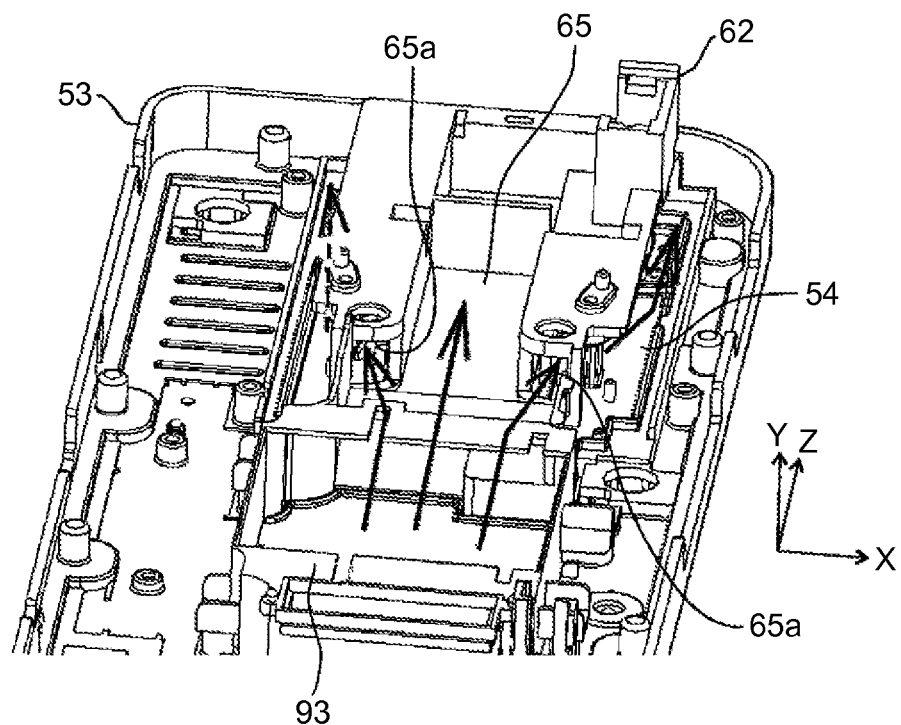
FIG. 26 is a perspective view illustrating air flows from the horizontal duct to the light source bracket, viewed from un upper side.

FIG. 25 illustrates airflow from the horizontal duct 93 to the light source bracket 62 when viewed from the under side of the base component 53. FIG. 26 illustrates airflow from the horizontal duct 93 to the light source bracket 62 when viewed from the upper side of the base component 53.

As illustrated in FIG. 25 and FIG. 26, the air from the horizontal duct 93 flows into the airflow path 65 or openings 65a formed in the light source bracket 62 of the light source unit 60. The air entered the openings 65a flows to between the access cover 54 and the light source bracket 62, so that the access cover 54 is cooled. Therefore, it is possible to take heat from the access cover 54. With regard to the airflow path 65 itself, heat is taken from both the light source 61 side thereof and the access cover 54 side thereof.

In the present embodiment, a halogen lamp, a metal halide lamp, a high pressure mercury lamp or the like may be used as the light source 61. Thereby, the light source 61 becomes high temperature when emitting light. The light source bracket 62 and the access cover 54 become also high temperature due to thermal conductance and heat radiation from the light source 61. When the light source unit 60 is replaced at the end of the lifetime, the access cover 54 and the light source bracket 62 are grabbed or touched by the user. Therefore, unless the access cover 54 and the light source bracket 62 are cooled, the light source unit 60 cannot be replaced. It is inconvenient. In the present embodiment, however, the airflow path 65 is disposed in the light source bracket 62 to cool the light source bracket 62 by passing the air through the path 65, and to cool the access cover 54 by passing the air between the access cover 54 and the light source bracket 62, as mentioned above. Thereby, the access cover 54 and the light source bracket 62 can be prevented form being heated to high temperature. Thereby, after the apparatus is stopped, the access cover 54 and the light source bracket 62 can be quickly cooled down to a temperature at which the user can grab or touch the cover 54 or the bracket 62. Therefore, in a case that the light source unit 60 needs to be replaced when the lifetime of the light source 61 ends during the operation of the apparatus, the user can grab or touch the access cover 54 and/or the handling portion 66 at early stage. Therefore, the light source unit 60 can be replaced with a new one at earlier stage than the replacement in the conventional projectors. Consequently, the downtime of the apparatus can be shortened.

In the present embodiment, the airflow path 65 may be protruded toward the access cover 54, so that the airflow path 65 is used as a grab portion for the user to grab it to pull out the light source unit 60 when the light source unit 60 is replaced. As mentioned above, the airflow path 65 is a part into which the air flows and which is cooled intensively. Thus, the airflow path 65 is a part the temperature of which is suppressed to low level in the light source bracket 62. Therefore, owing to the configuration in which the airflow path 65 can be used as the grab portion, the light source unit 60 can be replaced with a new one at much earlier stage. Consequently, the downtime of the apparatus can be further shortened.

In the present embodiment, as mentioned above, the light source bracket 62 is provided with the airflow path 65, so that the light source bracket 62 is cooled and thereby the temperature rise of the light source 61 is suppressed. Thereby, even if the amount of the air which flows into the light source 61 is decreased in comparison with the conventional amount, the light source 61 can be cooled well. Thereby, it is possible to reduce the rotation speed (rpm) of the light source blower 91. Thus, a wind noise (kazekirion) of the light source blower 95 can be reduced. Thereby, the noise of the apparatus can be reduced. Furthermore, since the rotation speed (rpm) of the light source blower 95 can be reduced, the electrical power for the apparatus can be saved. Furthermore, it is possible to use a small light source blower 95 generating a small amount of airflow. Thus, the apparatus can be downsized.

In the projector 1 according to the present embodiment, a pressing member to press the light source unit 60 against the main body is formed on the access cover 54. By pressing the light source unit 60 by the pressing member of the access cover 54, the light source unit 60 is fixed to the main body. Hereinafter, a more specific explanation will be made.

Figure 27:
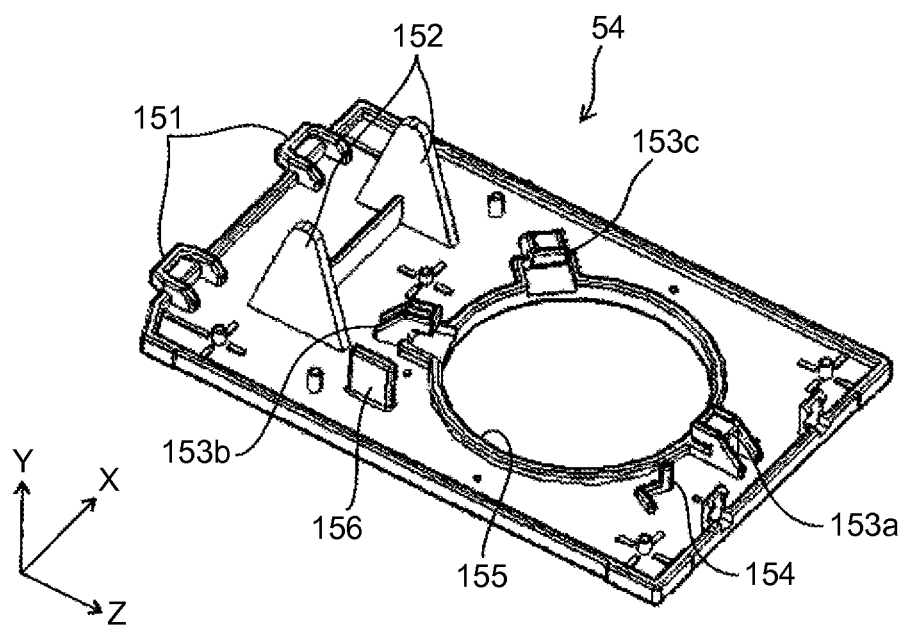
FIG. 27 is a perspective view illustrating the access cover.

FIG. 27 perspectively illustrates the access cover 54.

As illustrated in FIG. 27, the access cover 54 has an opening 155 to which the rotating operation member 54a is attached. At three positions around the opening 155, there are claws 153a to 153c for attaching the rotating operation member 54a rotatably to the access cover 54. At one end (the left end in the figure) of the access cover 54, there are two hook members 151 for hooking on the edge of the light source unit accessing opening 53c (see FIG. 32) which is an opening of the base component 53. Between the hook members 151 and the opening 155, there is a pair of pressing protrusions 152 as a second pressing member for pressing the light source unit 60 toward the installation direction of the light source unit 60. At the right side of the periphery of the opening 151 in the figure, there is a disengage preventing protrusion 154 for preventing the rotating operation member 54a from being disengaged from the access cover 54. At the pressing protrusion 152 side around the opening 155, there is an abutting member 156 on which a lock portion 161 of the rotating operation member 54a abuts when the rotating operation member 54a reaches the lock releasing position of the access cover 54.

Figure 28:
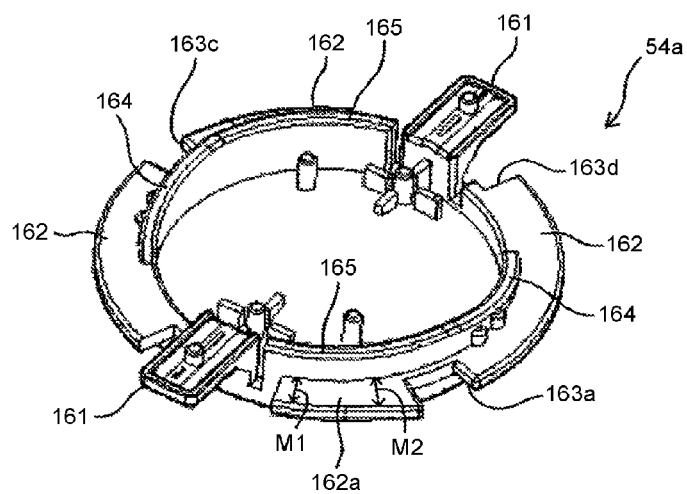
FIG. 28 is a perspective view illustrating a rotating operating member.

FIG. 28 perspectively illustrates the rotating operation member 54a.

As illustrated in FIG. 28, the rotating operation member 54a has basically a round shape having a diameter slightly shorter than a diameter of the opening 155, so that the rotating operation member 54a is fit in the opening 155 of the access cover 54. This round shaped rotating operation member 54a has two lock portions 161 (disposed at an upside and a downside in the figure) for fixing the access cover 54 to the base component 53, and a flange portion 162 extending circumferentially and protruding radially. The flange portion 162 has four cut off portions 163 circumferentially. A part 162a of the flange portion 162 is located at the front side in the figure and opposed to the disengagement preventing protrusion 154 when the rotating operation member 54a is attached to the access cover 54. A height M1 in the radial direction at one end of the part 162a (left side in the figure) is lower than a height M2 in the radial direction at the other end of the part 162a (right side in the figure). From one end to the other end, the height in the radial direction gradually increases. The height M2 in the radial direction at the other end of the part 162a is taller than other heights in the radial direction of the part 162a.

Around a periphery of the rotating operation member 54a, there are two pressing members 165 (left side of the upper lock portion 161, right side of the lower lock portion 161), which protrude toward the light source unit (upper direction in the figure), as pressing members for abutting on the airflow path 65 of the light source bracket 62 and pressing the light source unit 60 toward the installation direction of the light source unit 60, when the access cover 54 is fixed to the base component 53. Therefore, the airflow path 65 can be pressed at two points distanced from each other. At downstream direction of the pressing members 165 when the rotating operation member 54a is rotated from the lock releasing position to the lock position (counter clockwise direction in the figure), there are tapered slope portions 164 each having a tapered slope gradually protruding toward the light source unit from the downstream direction to the pressing unit 165 in the rotation direction.

Figure 29:
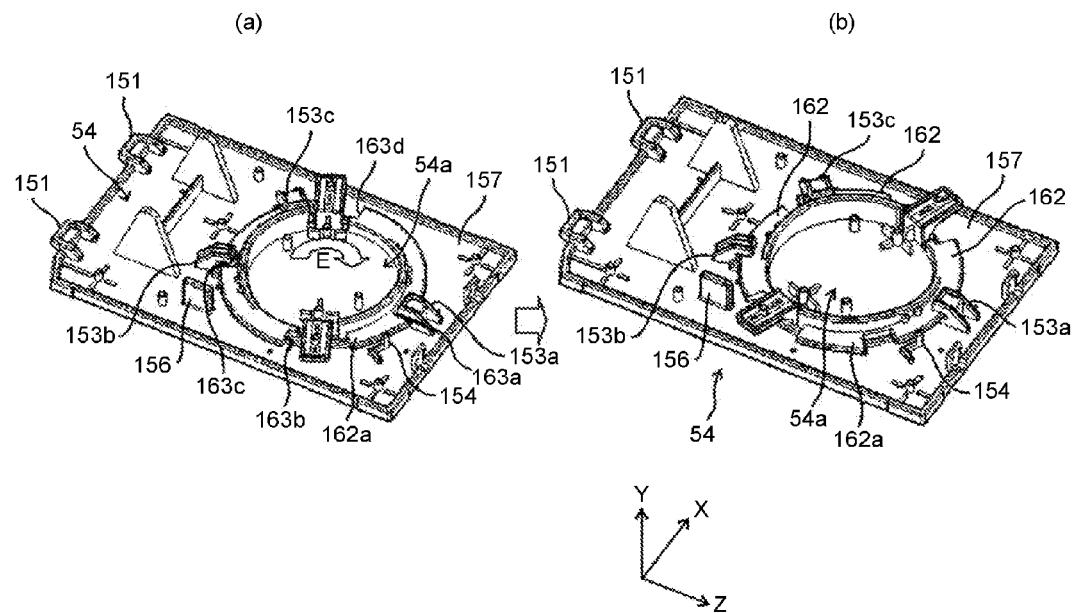
FIG. 29 is a perspective view illustrating an installation of the rotating operating member to the access cover.

FIG. 29 perspectively illustrates the attachment of the rotating operation member 54a to the access cover 5.

When the rotating operation member 54a is to be attached to the opening 155 of the access cover 54, the cut off portion 163a of the rotating operation member 54a is positioned to the claw 153a, the cut off portion 163c is positioned to the claw 153b, and the cut off portion 163d is positioned to the claw 153c, as illustrated in FIG. 29A. Then, the rotating operation member 54a is engaged with the opening 155 of the access cover 54. Thereby, the rotating operation member 54a can be attached to the opening 155 of the access cover 54 without abutting the flange portion 162 on the claws 153a to 153c. At this time, one end of the part 162a facing the disengagement preventing protrusion 154 faces the disengagement preventing protrusion 154.

After the rotating operation member 54a is attached to the opening 155 of the access cover 54, the rotating operation member 54a is rotated in a direction indicated by an arrow E in the figure (clockwise direction in the figure). Then, the flange portion 162 enters between the claws 153a to 153c and the base plate 157 of the access cover 54. The part 162a abuts on the disengagement preventing protrusion 154. If the rotating operation member 54a is further rotated from this state by applying force, the disengagement preventing protrusion 154 deforms elastically to climb over the part 162a. Thereby, as illustrated in FIG. 29B, the rotating operation member 54 is rotatably attached to the access cover 54. The disengagement preventing protrusion 154 is disposed so as not to abut on other part of the flange portion 162. Thereby, the disengagement preventing protrusion 154 does not become an obstacle of the operation, when the rotating operation member 54a is operated to fix or release the access cover 54.

If the rotating operation member 54a is rotated in the counter clockwise direction in the figure from the state illustrated in FIG. 29B, the disengagement preventing protrusion 154 abuts on the other end of the part 162a, so that the rotation of the rotating operation member 54a is restricted by the protrusion 154. Thereby, the cut off portions 163a, 163c, and 163d of the rotating operation member 54a are prevented from being rotated to each position facing the claws 153a, 153b, and 153c. Thus, it is possible to prevent the disengagement of the rotating operation member 54 from the access cover 54, after the rotating operation member 54 is attached to the access cover 54.

Next, an explanation will be made on a fixing of the access cover to the base component 53 as the main body.

Figure 30:
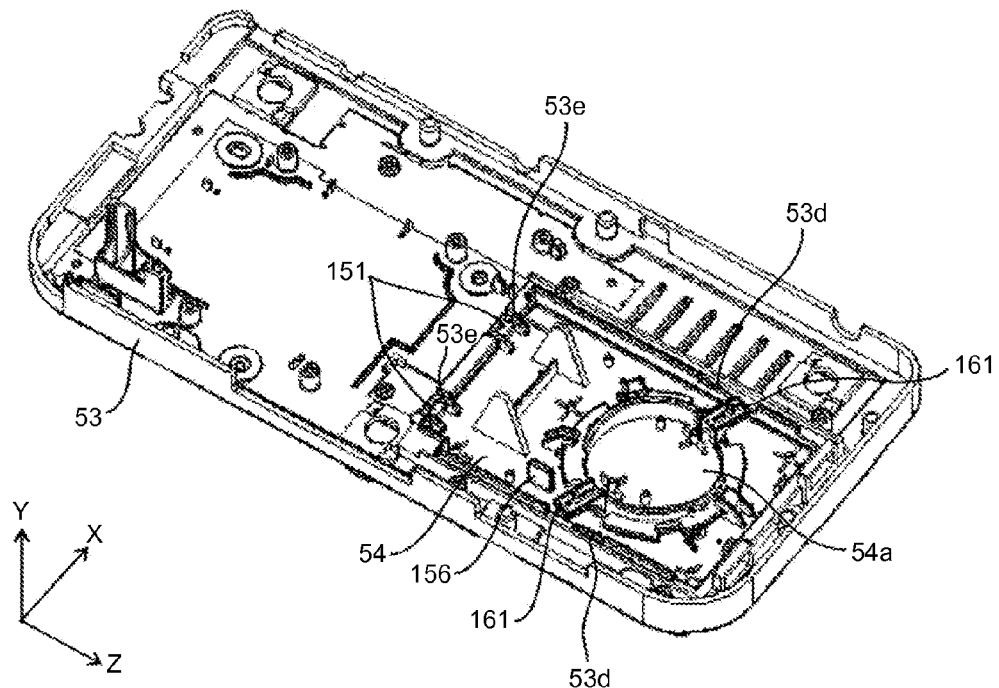
FIG. 30 is a perspective view illustrating a state that the access cover is attached to a light source unit accessing opening of the base component.

FIG. 30 perspectively illustrates the state that the access cover 54 is attached to the light source unit accessing opening 53c of the base component 53.

As illustrated in FIG. 30, edges of the light source unit accessing opening 53c of the base component 53 protrude toward inside (upward in the figure), and have cut off portions 53d at positions facing the lock portions 161 of the rotating operation member 54a. At one edge (left side in the figure) of the light source unit accessing opening 53c, there are cut off portions 53e on which the hook members 151 of the access cover 54 hook.

The access cover 54 is more elastically deformable than components having abutting members (e.g. the lighting bracket 26 and the power source side connector 171) which abut on the light source unit 60 when the light source unit 60 is mounted on the main body.

When the rotating operation member 54a is located at the lock releasing position, the lock portions 161 do not face the cut off portions 53d. When the access cover 54 is to be fixed to the base component 53, the rotating operation member 54a is rotated in counter clockwise direction in the figure from the lock releasing position.

Figure 31:
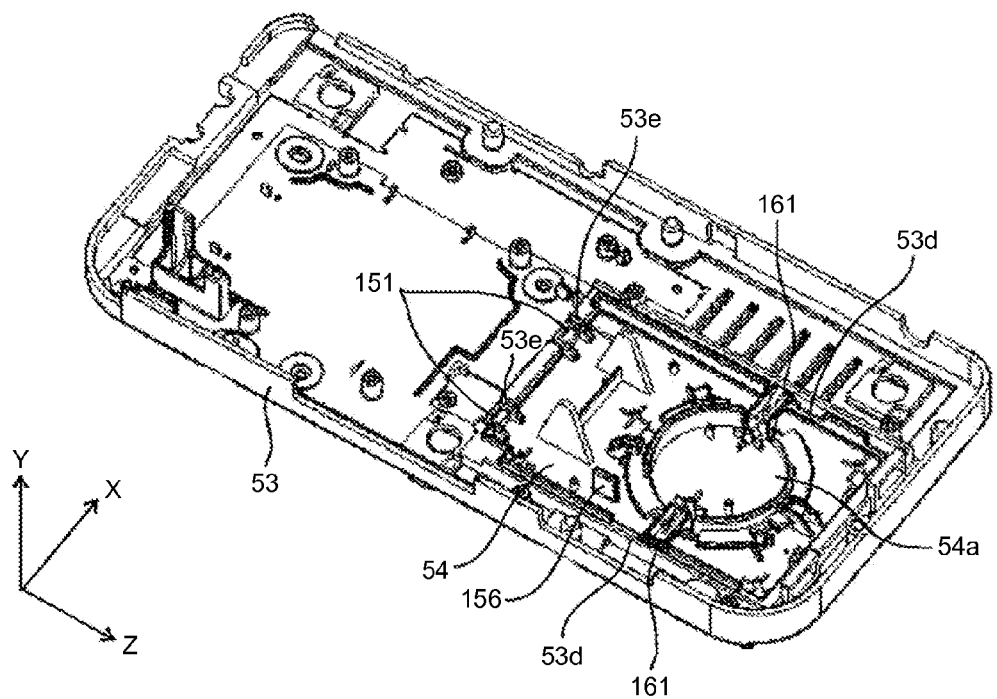
FIG. 31 is a perspective view illustrating a state that the access cover is fixed to the light source unit accessing opening of the base component.

FIG. 31 perspectively illustrates the state that the access cover 54 is fixed to the light source unit accessing opening 53c of the base component 53.

When the rotating operation member 54a is located at the lock position, a part of each of lock portions 161 faces each of cut off portions 53d. Thereby, the rotating operation member 54a reaches a position where the access cover 54 is fixed to the base component 53, so that the access cover 54 is fixed to the base component 53. If the rotating operation member 54a moves to the lock position, each of the lock portions 161 abuts on an end of each of cut off portions 53d. Thereby, the user who operates the rotating operation member 54a senses that the rotating operation member reaches the lock position.

FIG. 32 illustrates a fixing of the access cover 54 to the light source unit accessing opening 53c of the base component 53.

Figure 32A:
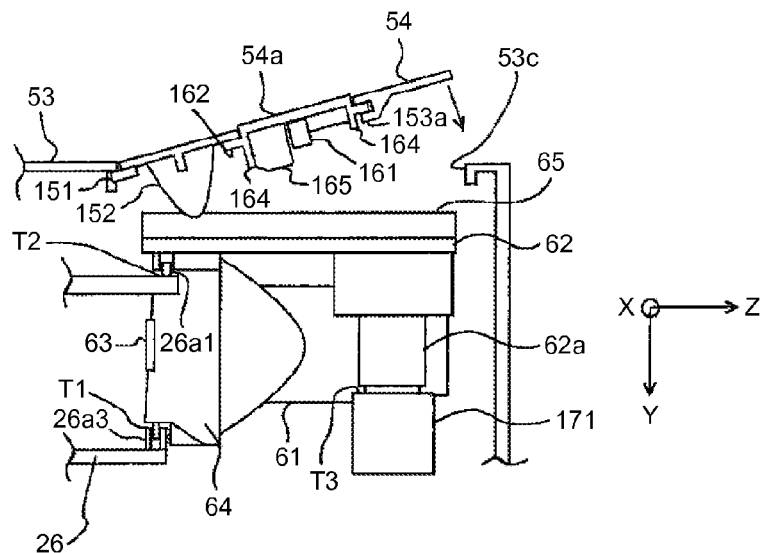
FIGS. 32A to 32C are schematic views illustrating an installation to attach and fix the access cover to the light source unit accessing opening of the base component.

As illustrated in FIG. 32A, when the light source unit 60 is inserted into the main body, the positioning portions 64a1 to 64a3 formed on the holder 64 of the light source unit 60 engages with the light source positioning joint portions 26a1 to 26a3 formed on the lighting bracket 62, and a male type power source side connector 171 engages with a female type connector 62a. Thereby, the light source unit 60 is positioned in Z direction and X direction in the main body.

When the access cover 54 is attached to the light source unit accessing opening 53c of the base component 53, the hook members 151 are hooked on the cut off portions 53e. Then, the access cover 54 is rotated in clockwise direction in the figure around the hook members 151 as supporting points. If the access cover 54 is further rotated, the pair of pressing protrusions 152 formed at the side of the hook members 151 abut against both sides of the airflow path 65 of the light source bracket 62. If the access cover 54 is further rotated from this position, the pair of pressing protrusions 152 press the holder 64 side of the light source unit 60. Consequently, a surface 64d2 (see FIG. 6) of the holder 64 of the light source unit 60 where the positioning protrusion 64a3 is formed abuts on an edge T1, as an abutting member, of the light source positioning joint hole 26a3 formed on the lighting bracket 26. A surface 64d1 (see FIG. 6) of the holder 64 where the positioning holes 64a1 and 64a2 are formed abuts on a surface T2, as abutting members, of the lighting bracket 26 on which the light source positioning joint protrusions 26a1 and 26a2 are formed. Thereby, the holder 64 side of the light source unit 60 is sandwiched and fixed between the pressing protrusions 152 and the lighting unit 20. Then, as illustrate in FIG. 32B, the access cover 54 is attached to the light source unit accessing opening 53c. The situation at this stage is illustrated in FIG. 33. FIG. 33 perspectively illustrates the lighting unit 20 and the light source unit 60 with the base component 53.

In the present embodiment, the pair of pressing protrusions 152 is disposed near the hook members 151. Incidentally, the hook members 151 are supporting points of the rotating movement of the access cover 54 when the access cover 54 is to be attached to the light source unit accessing opening 53c. The point of load of this leverage assuming the hook members 151 as supporting points is the abutting points of the pressing protrusions 152 on the light source unit 60, while the point of effort is the other end of the access cover 54 opposite to the hook members 151. Thus, the points of loads are nearer to the supporting points than the point of effort in the leverage. Thereby, the light source unit 60 can be pressed toward its installation direction only by a small force. Thus, it is possible to easily attach the access cover 54 to the light source unit accessing opening 53c.

Figure 32B:
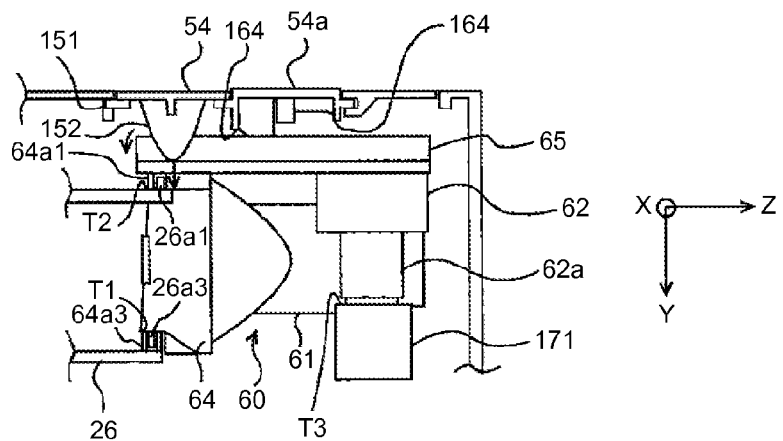
Figure 32C:
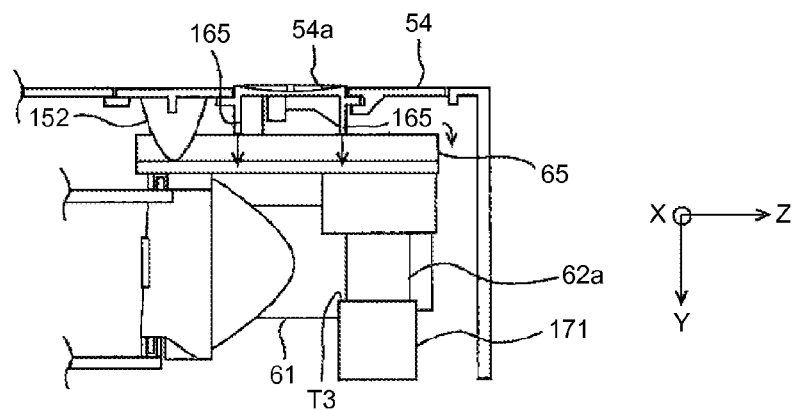
Figure 33:
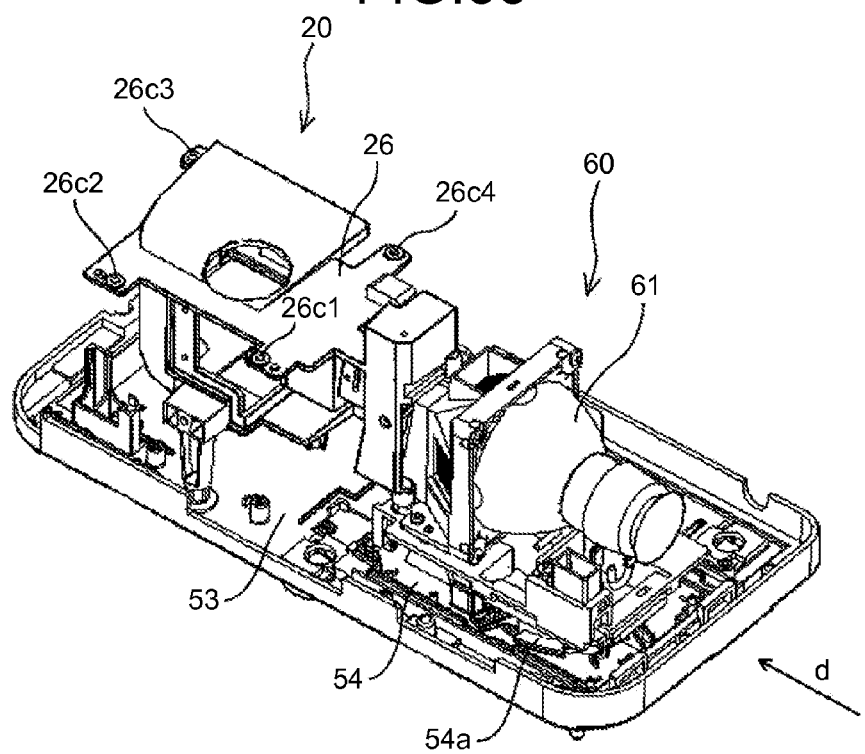
FIG. 33 is a perspective view illustrating a state that the access cover is fixed to the light source unit accessing opening, with the lighting unit, the light source unit, and the base component.
Figure 34:
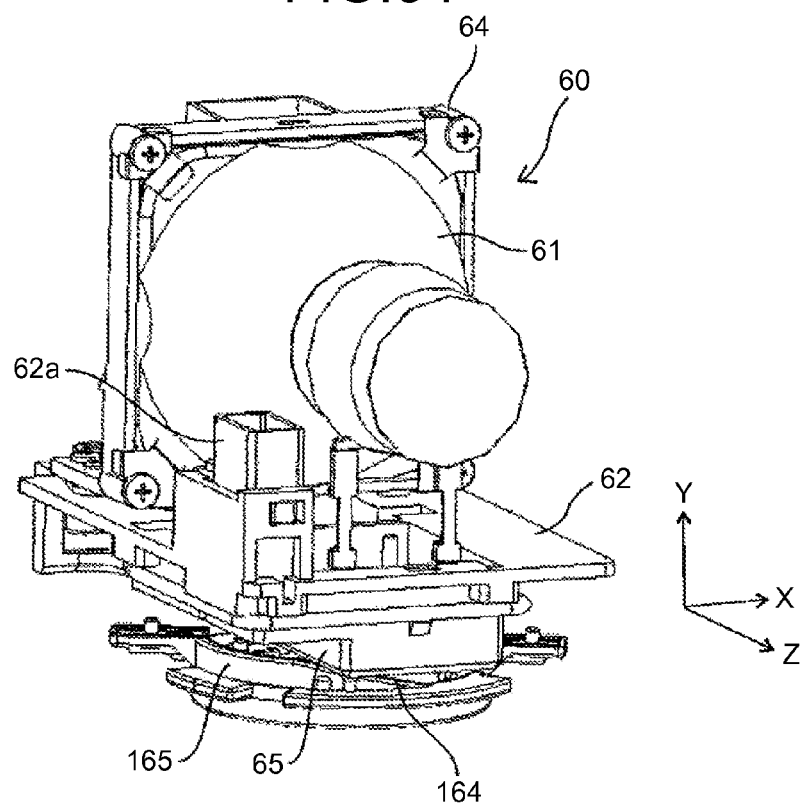
FIG. 34 is a perspective view from a direction indicated by an arrow d in FIG. 33, illustrating a state that the rotating operating member is positioned at a lock releasing position.
Figure 35:
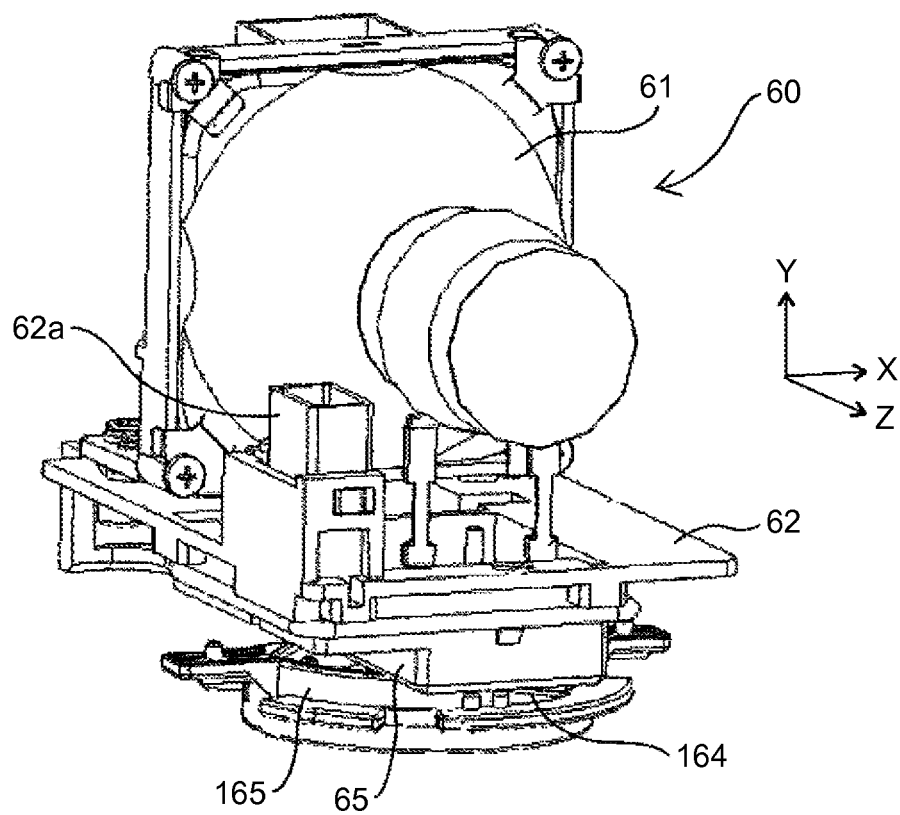
FIG. 35 is a perspective view from a direction indicated by an arrow d in FIG. 33, illustrating a state that the rotating operating member is positioned at a lock position.

As illustrated in FIG. 32B and FIG. 34, when the rotating operation member 54a is located at the lock releasing position, the slope portions 164 face the airflow path 65 but the light source unit 60 is not pressed by the pressing portions 165. If the rotating operation member 54a is rotated from the releasing position to the lock position, the pressing portion 165 side of each of the slope portions 164 abuts on the airflow path 65 as a pressed member of the light source bracket. If the rotating operation member 54a is further rotated to the lock position, the slope portions 164 press the airflow path 65. Thereby, the male type power source side connector 171 is thoroughly inserted into the female type connector 62a, so that the power source side connector 171 and the connector 62a are surely connected. The edge of female type connector 62a abuts on an abutting portion T3 of the power source side connector 171. If the rotating operation member 54a reaches the lock position, as illustrated in FIG. 32C and FIG. 35, the pressing portions 165 press the airflow path 65, so that the connector 62a side of the light source unit 60 is sandwiched and fixed between the pressing portions 165 and the abutting portion T3 of the power source side connector 171.

Thus, when the access cover 54 is fixed to the base component 53 of the main body, the light source unit 60 is pressed by the pressing protrusions 152 and the pressing portions 165 of the access cover 54, so that the light source unit 60 is sandwiched and fixed in the main body of the apparatus. Thereby, the light source unit 60 is positioned and fixed in Y direction. The access cover 54 is more elastically deformable than components having abutting members or portions (e.g. the lighting bracket 26 and the power source side connector 171) which abut on the light source unit 60 when the light source unit 60 is mounted on the main body. Thereby, the access cover 54 elastically deforms, when the access cover 54 is going to be fixed to the base component 53 of the main body and the light source unit 60 is pressed by the pressing protrusions 152 and the pressing portions 165. Thereby, the fixed position of the light source unit in the main body does not deviate in Y direction.

Owing to the slope portions 164 each height of which gradually increases toward the pressing portions 165, an operation resistance in rotating the rotating operation member 54*a* from the lock releasing position to the lock position can be maintained constant. Thereby, without great force to rotate the rotating operation member 54*a* to the lock position, it is possible to abut the pressing portions 165 on the airflow path 65 at two distant positions.

A plurality of a pair of slope 164 and pressing portion 165 is disposed in the rotating direction of the rotating operation member 54*a* at even intervals. Thereby, when the rotating operation member 54*a* is rotated to the lock position to press the light source unit 60, the reactive force of the pressing force is applied onto the rotating operation member 54*a* evenly. Therefore, when the rotating operation member 54*a* is rotated to the lock position, it is possible to prevent the friction between the flange portion 162 of the rotating operation member 54*a* and the claw portion 153*a* due to the inclination of the rotating operation member 54*a*. Thereby, it is possible to prevent the increase of the operation resistance in rotating the rotating operation member 54*a* to the lock position.

When the rotating operation member 54*a* is to be removed from the base component 53, the rotating operation member 54*a* is rotated to a reverse direction to the above mentioned direction. Then, the lock portions 161 become not to face the cut off portions 53*d*. Thus, the lock between the access cover 54 and the base component 53 is released. If the rotating operation member 54*a* is further rotated from this state, the lock portion 161 abuts on the abutting portion 156, so that the rotation of the rotating operation member 54*a* is stopped. Thereby, the user who operates the rotating operation member 54*a* senses that the lock (fix state) between the access cover 54 and the base component 53 is released.

Thus, in the present embodiment, the light source unit 60 can be positioned and fixed in Y direction (removing and inserting direction of the unit 60) in conjunction with the fixing of the access cover 54 to the base component 53 of the main body. Thereby, the light source unit 60 can be replaced by a simple operation or procedure. Furthermore, the light source unit 60 can be positioned and fixed in Z direction and X direction only by inserting the light source unit 60 into the main body. Thus, the light source unit 60 can be replaced by a much simpler operation or procedure.

The above explanations are only examples. The present invention has specific effects for each of the following aspects (1) to (7) including embodiments.

(1)

An image projection apparatus such as a projector 1 includes a light source unit 60 including a light source 61 and configured to be attachable to and detachable from a main body of the apparatus, an image forming part configured to form an image by using a light from the light source 61, a projection optical system configured to project the image, an openable and closable cover 54 such as an access cover configured to open and close an opening such as a light source unit accessing opening 53*c*, the opening formed for attaching and detaching the light source unit to and from the main body, an abutting member on which the light source unit 60 abuts when the light source unit is attached to the main body, and a pressing member such as a pressing portion 165 configured to press the light source unit 60 to the abutting member, in conjunction with a fix operation of the openable and closable cover 54 to the main body.

According to the configuration as such, when the openable and closable cover 54 is fixed to the main body of the apparatus, the light source unit 60 is pressed by the pressing member toward the abutting member, so that the light source unit 60 is sandwiched and fixed between the pressing member and the abutting member. Thus, the light source unit 60 is fixed, in conjunction with the fix operation of the openable and closable cover 54 to the main body of the apparatus. Therefore, the light source unit 60 can be readily replaced, in comparison with the image projection apparatus disclosed in Japanese Patent Application Laid-open No. 2010-85555 which needs another operation for fixing the light source unit, in addition to an operation for fixing the openable and closable cover to the main body of the apparatus.

Incidentally, in the present embodiment, the image forming part includes a lighting unit 20 and an image forming unit 10. Furthermore, the projection optical system includes a first optical unit 30 and a second optical unit 40. Also in the present embodiment, the abutting member is embodied by an edge T1 of a light source positioning joint hole 26*a*3 of a lighting bracket 26, a surface T2 of the lighting bracket 26 on which light source positioning joint protrusions 26*a*1 and 26*a*2 are formed, and an abutting portion T3 of a power source side connector 171.

(2)

In the image projection apparatus described in (1), the openable and closable cover 54 includes a rotating operation member 54*a* rotatably attached to the openable and closable cover 54, the rotating operation member 54*a* allowing, when rotated, for fixing or releasing of the openable and closable cover 54 to or from the main body. The pressing member is apart from the light source unit 60 while the rotating operation member 54*a* is located at a lock releasing position where a lock between the openable and closable cover 54 and the main body is released. The pressing member abuts on the light source unit 60 when the rotating operation member 54*a* is rotated from the lock releasing position to a lock position where the openable and closable cover 54 is locked to the main body, so that the pressing member presses the light source unit 60.

According to the configuration as such, in conjunction with the fix operation of the cover 54 to the main body, the light source unit 60 is pressed by the pressing member, so that the light source unit 60 is sandwiched and fixed between the pressing member and the abutting member.

(3)

In the image projection apparatus described in (2), the pressing member includes a pressing portion 165 and a slope portion 164 on a surface of the rotating operation member 54*a* opposite to the light source unit 60. The pressing portion 165 protrudes toward the light source unit 60 and presses the light source unit 60 by abutting on a pressed portion such as an airflow path 65 of the light source unit 60, while the rotating operation member 54*a* is located at the lock position. The pressed portion such as the airflow path 65 is protruded from a surface of the light source unit 60. The surface is opposite to the openable and closable cover 54. The slope portion 164 is adjacent to the pressing portion 165 on an upstream side of a rotating direction of the rotating operation member 54*a* when the rotating operation member 54*a* is rotated from the lock releasing position to the lock position, and a height of the slope portion 164 gradually increases from the upstream side to a downstream side of the rotation of the rotating operation member 54*a* when the rotating operation member 54*a* is rotated from the lock releasing position to the lock position. The height of the slope portion 164 is a height from a surface of the rotating operation member 54*a* opposite to the light source unit 60.

According to the configuration as such, an operation resistance when the rotating operation member 54*a* is rotated from the lock releasing position to the lock position can be maintained constant. Thereby, it is possible to abut the pressing portion 165 on the pressed member such as the airflow path 65, without great force to rotate the rotating operation member 54a to the lock position.

(4)

In the image projection apparatus described in (3), a plurality of a pair of the pressing portion 165 and the slope portion 164 is disposed in a rotating direction of the rotating operation member 54a at even intervals.

According to the configuration as such, when the rotating operation member 54a is rotated to the lock position to press the light source unit 60, reactive force of the pressing force is applied evenly on the rotating operation member 54a. Therefore, when the rotating operation member 54a is rotated to the lock position, it is possible to prevent the friction between the rotating operation member 54a and the cover 54 due to the inclination of the rotating operation member 54a. Thereby, it is possible to prevent the increase of the operation resistance in rotating the rotating operation member 54a to the lock position. Furthermore, the airflow path 65 can be pressed at the plurality of positions.

(5)

In the image projection apparatus described in (3) or (4), the openable and closable cover 54 includes a hook member 151 to hook on an edge of the opening such as a light source unit accessing opening 53c. The openable and closable cover 54 is attached to the main body by hooking the hook member 151 on the edge of the opening, and rotating the openable and closable cover 54 around the edge as a supporting point. The openable and closable cover 54 includes a second pressing member such as a pair of pressing protrusions 152 at a position nearer to the hook member 151 than the rotating operation member 54a and configured to press the light source unit 60 against the abutting member.

According to the configuration as such, the light source unit 60 can be sandwiched and fixed at a position or area nearer to the hook member 151 than the rotating operation member 54a between the second pressing member and the abutting member. Thereby, the light source unit 60 can be sandwiched and fixed in the main body of the apparatus more surely, in comparison with a case that the light source unit 60 is pressed only by the pressing portion 165 formed on the rotating operation member 54a. Furthermore, the second pressing member is disposed nearer to the hook member 151 than the rotating operation member 54a. The hook member 151 in this case acts as the supporting point of the rotating movement of the cover 54, when the cover 54 is attached to the main body. Thereby, the abutting point between the second pressing member and the light source unit which acts as the point of lord in the leverage assuming the hook member 151 as the supporting point is nearer to the supporting point than the point of effort. Therefore, the light source unit 60 can be pressed to its installation direction with small force. Thus, the cover 54 can be attached to the opening readily.

(6)

In the image projection apparatus described in any of (1) to (5), the openable and closable cover 54 is more elastically deformable than the light source unit 60 and the abutting member.

According to the configuration as such, when the light source unit 60 is pressed, the cover 54 elastically deforms. Thereby, it is possible to prevent the deformation of the light source unit 60 and the abutting member. Thereby, it is possible to prevent the light source unit 60 from changing its posture or position in the main body of the apparatus.

(7)

In the image projection apparatus described in any of (1) to (6), the projection optical system B is disposed on or above the image forming part A. Furthermore, the light source 61 and the image forming part A are aligned in a direction parallel to a plane of a projection image. An image is projected from the upper surface of the apparatus toward a projection plane.

According to the configuration as such, the length of the apparatus in a direction orthogonal to the projection plane 101 can be shortened. Thereby, the installation space of the apparatus can be saved in the direction orthogonal to the plane of the projection image. Thereby, when the image projection apparatus is used on a desk or the like in a small room, the apparatus does not become an obstacle for the layout of desks and chairs in the room. In a case that the apparatus is used by hanging it from the ceiling or the like, it is possible to prevent the interference between the apparatus and a lighting equipment on the ceiling. Thus, the apparatus can be installed at a predetermined position. Consequently, there is provided a convenient image projection apparatus.

According to the present invention, when the access cover is fixed to the main body of the apparatus, the light source unit is pressed toward the abutting member by the pressing member, so that the light source unit is sandwiched and fixed between the pressing member and the abutting member. Thus, in conjunction with the fix operation of the access cover to the main body of the apparatus, the light source unit is fixed. Therefore, the light source unit can be replaced more readily, in comparison with the conventional image projection apparatus disclosed by Japanese Patent Application Laid-open No. 2010-85555 which needs another operation to fix the light source unit, in addition to the fix operation of the access cover to the main body of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus, comprising:
   a light source unit including a light source and a light source bracket to which the light source is mounted;
   a casing that houses the light source unit, the casing including an opening through which the light source unit passes when the light source unit is inserted into and removed from the image projection apparatus, and the casing including a cover to open and close the opening;
   a fan to generate an airflow; and
   an airflow path through which the airflow generated by the fan passes,
   wherein the light source unit includes a protrusion which protrudes outwardly from the light source unit, the airflow path being internal to the protrusion so that air which passes through the airflow path cools an interior of the protrusion, and
   wherein the protrusion contacts the cover.

2. The image projection apparatus according to claim 1, wherein the cover includes a rotational operation member to secure the cover to the casing.

3. The image projection apparatus according to claim 1, further comprising:
   a handle attached to the light source bracket.

4. The image projection apparatus according to claim 3, wherein the handle is rotatable so that the light source unit can be removed from the image projection apparatus.

5. The image projection apparatus according to claim 4, wherein the handle is rotatable about an axis parallel to a bottom of the casing.

6. The image projection apparatus according to claim 1, wherein the airflow path includes at least two openings disposed on opposite sides of the airflow path and at opposite sides of the light source unit.

7. An image projection apparatus, comprising:
a light source unit including a light source and a light source bracket to which the light source is mounted;
a casing that houses the light source unit, the casing including an opening through which the light source unit passes when the light source unit is inserted into and removed from the image projection apparatus, and the casing including a cover to open and close the opening;
a fan to generate an airflow; and
an airflow path through which the airflow generated by the fan passes,
wherein the light source unit includes a protrusion which protrudes outwardly from the light source unit, the airflow path being internal to the protrusion so that air which passes through the airflow path cools an interior of the protrusion, and
wherein the protrusion is at one side of the airflow path, and the cover is at an opposite side of the airflow path so that both the cover and the protrusion are cooled by the airflow path.

8. An image projection apparatus, comprising:
a light source unit including a light source and a light source bracket to which the light source is mounted;
a casing that houses the light source unit, the casing including an opening through which the light source unit passes when the light source unit is inserted into and removed from the image projection apparatus, and the casing including a cover to open and close the opening;
a fan to generate an airflow; and
an airflow path through which the airflow generated by the fan passes,
wherein the light source unit includes a protrusion which protrudes outwardly from the light source unit, the airflow path being internal to the protrusion so that air which passes through the airflow path cools an interior of the protrusion, and
wherein the protrusion is at an upper side of the airflow path, and the cover is at a lower side of the airflow path so that both the cover and the protrusion are cooled by the airflow path.

9. An image projection apparatus, comprising:
a light source unit including a light source and a light source bracket to which the light source is mounted;
a casing that houses the light source unit, the casing including an opening through which the light source unit passes when the light source unit is inserted into and removed from the image projection apparatus, and the casing including a cover to open and close the opening;
a fan to generate an airflow;
an airflow path through which the airflow generated by the fan passes; and
a handle attached to the light source bracket,
wherein the light source unit includes a protrusion which protrudes outwardly from the light source unit, the airflow path being internal to the protrusion so that air which passes through the airflow path cools an interior of the protrusion, and
wherein the protrusion and the handle are cooled by the airflow in the airflow path.

10. An image projection apparatus, comprising:
a light source unit including a light source and a light source bracket to which the light source is mounted;
a casing that houses the light source unit, the casing including an opening through which the light source unit passes when the light source unit is inserted into and removed from the image projection apparatus, and the casing including a cover to open and close the opening;
a fan to generate an airflow; and
an airflow path through which the airflow generated by the fan passes,
wherein the light source unit includes a protrusion which protrudes outwardly from the light source unit, the airflow path being internal to the protrusion so that air which passes through the airflow path cools an interior of the protrusion,
wherein the airflow path includes at least two openings disposed on opposite sides of the airflow path and at opposite sides of the light source unit, and
wherein the two openings are disposed on opposite sides of the protrusion of the light source so that sides of the protrusion of the light source unit are at the airflow path and parallel to the airflow path.

11. A light source unit for use with an image projection apparatus which includes a casing to house the light source unit, the casing including an opening through which the light source unit passes when the light source unit is inserted into and removed from the image projection apparatus, and the casing including a cover to open and close the opening, the image projection apparatus further including a fan to generate an airflow, and an airflow path through which the airflow generated by the fan passes, the light source unit, comprising:
a light source;
a light source bracket to which the light source is mounted, the light source bracket including a protrusion which protrudes outwardly from the light source unit, the airflow path of the image projection apparatus joining an airflow path which is internal to the protrusion so that air which passes through the airflow path of the light source unit cools an interior of the protrusion,
wherein the protrusion protrudes from a central region of the light source unit, and
wherein a depth of the light source unit at sides of the protrusion is shallower than a depth of the light source unit at the protrusion so that the airflow can flow along sides of the protrusion.

12. The light source unit according to claim 11, wherein:
the protrusion is disposed to be parallel to a length of the light source unit, and parallel to the airflow path, when the light source unit is disposed within the image projection apparatus.

13. The light source unit according to claim 11, further comprising:
a handle attached to the light source bracket.

14. The light source unit according to claim 13, wherein the handle is rotatable so that the light source unit can be removed from the image projection apparatus.

15. The light source unit according to claim 14, wherein the handle is rotatable about an axis parallel to a bottom of the light source unit.

16. A light source unit for use with an image projection apparatus which includes a casing to house the light source unit, the casing including an opening through which the light source unit passes when the light source unit is inserted into and removed from the image projection apparatus, and the casing including a cover to open and close the opening, the image projection apparatus further including a fan to generate an airflow, and an airflow path through which the airflow generated by the fan passes, the light source unit, comprising:
- a light source;
- a light source bracket to which the light source is mounted, the light source bracket including a protrusion which protrudes outwardly from the light source unit, the airflow path of the image projection apparatus joining an airflow path which is internal to the protrusion so that air which passes through the airflow path of the light source unit cools an interior of the protrusion; and
- a handle attached to the light source bracket,
- wherein the protrusion and the handle are cooled by the airflow in the airflow path, when the light source unit is installed in the image forming apparatus.

* * * * *